US010882783B2

(12) United States Patent
Tanaka et al.

(10) Patent No.: US 10,882,783 B2
(45) Date of Patent: Jan. 5, 2021

(54) OPTICAL FIBER RIBBON AND OPTICAL FIBER CABLE

(71) Applicant: Furukawa Electric Co., Ltd., Tokyo (JP)

(72) Inventors: Hiroki Tanaka, Tokyo (JP); Yutaka Hoshino, Tokyo (JP); Hirotaka Watanabe, Tokyo (JP); Yoshihiro Arashitani, Tokyo (JP); Kenji Yokomizo, Tokyo (JP); Tomohiro Ishimura, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/995,796

(22) Filed: Jun. 1, 2018

(65) Prior Publication Data

US 2018/0273427 A1    Sep. 27, 2018

Related U.S. Application Data

(63) Continuation of application No. PCT/JP2016/084554, filed on Nov. 22, 2016.

(30) Foreign Application Priority Data

Dec. 1, 2015  (JP) ................................ 2015-234441

(51) Int. Cl.
*C03C 25/24*    (2018.01)
*C03C 25/105*    (2018.01)
(Continued)

(52) U.S. Cl.
CPC ............ *C03C 25/24* (2013.01); *C03C 25/104* (2013.01); *C03C 25/105* (2013.01);
(Continued)

(58) Field of Classification Search
CPC ...... C03C 25/24; C03C 25/475; C03C 25/104; G02B 6/02395; G02B 6/44; G02B 6/4403
See application file for complete search history.

(56) References Cited

U.S. PATENT DOCUMENTS

| 6,195,491 | B1 * | 2/2001 | Jackson | ............... | G02B 6/4404 385/106 |
| 6,600,859 | B2 * | 7/2003 | Chandraiah | .......... | G02B 6/4404 385/100 |

(Continued)

FOREIGN PATENT DOCUMENTS

| CN | 101027369 A | 8/2007 |
| EP | 1797149 A1 | 6/2007 |

(Continued)

OTHER PUBLICATIONS

Taiwan Intellectual Property Office, Official Action dated Jun. 1, 2018 in Taiwanese Patent Application No. 105139259 with English translation, 9 pages.

(Continued)

*Primary Examiner* — Peter Radkowski
(74) *Attorney, Agent, or Firm* — Masuvalley & Partners

(57) ABSTRACT

An optical fiber ribbon is intermittently connected in a length direction by an intermittent connection which includes a polyol having a weight-average molecular weight of 3000 to 4000 in a specific amount relative to the entire intermittent connection and which has Young's modulus at 23° C. within a specific range. When collectively unitizing optical fiber ribbons to form an optical fiber cable, an optical fiber ribbon is formed which maintains advantages of the optical fiber ribbon and which prevents cracks of the intermittent connection and detachment of the intermittent connection from a colored optical fiber core when the cable is subjected to repetitive ironing.

8 Claims, 9 Drawing Sheets

(51) Int. Cl.
    *C03C 25/475*     (2018.01)
    *C03C 25/104*     (2018.01)
    *G02B 6/44*     (2006.01)
    *G02B 6/02*     (2006.01)

(52) U.S. Cl.
    CPC .......... *C03C 25/475* (2018.01); *G02B 6/4403* (2013.01); *G02B 6/02395* (2013.01); *G02B 6/441* (2013.01); *G02B 6/4482* (2013.01)

(56) References Cited

U.S. PATENT DOCUMENTS

| | | | | |
|---|---|---|---|---|
| 6,610,815 | B1* | 8/2003 | Hata | C08G 73/10 430/283.1 |
| 6,853,783 | B2* | 2/2005 | Chiasson | G02B 6/4404 385/114 |
| 6,898,356 | B2* | 5/2005 | Sato | C03C 25/1065 385/114 |
| 7,151,879 | B2* | 12/2006 | Ishikawa | G02B 6/4403 385/114 |
| 7,187,830 | B2* | 3/2007 | Blazer | G02B 6/4404 385/100 |
| 7,493,000 | B2* | 2/2009 | Yamaguchi | C08F 290/147 385/128 |
| 2003/0002831 | A1* | 1/2003 | Chandraiah | G02B 6/4404 385/114 |
| 2004/0022512 | A1* | 2/2004 | Sato | C03C 25/1065 385/128 |
| 2004/0146255 | A1* | 7/2004 | Ishikawa | G02B 6/4403 385/114 |
| 2004/0170364 | A1* | 9/2004 | Chiasson | G02B 6/4404 385/114 |
| 2006/0133749 | A1* | 6/2006 | Blazer | G02B 6/448 385/114 |
| 2007/0037897 | A1* | 2/2007 | Wang | B29C 33/60 523/106 |
| 2008/0045623 | A1* | 2/2008 | Yamaguchi | C03C 25/106 522/83 |
| 2008/0132630 | A1* | 6/2008 | Konduri | C08L 67/02 524/414 |
| 2008/0219635 | A1* | 9/2008 | Yamaguchi | C08F 290/147 385/144 |
| 2014/0033411 | A1* | 2/2014 | Kisailus | B32B 5/12 2/455 |
| 2015/0234140 | A1 | 8/2015 | Tanaka et al. | |

FOREIGN PATENT DOCUMENTS

| | | |
|---|---|---|
| JP | H10-204250 A | 8/1998 |
| JP | 2002-350697 A | 12/2002 |
| JP | 2006-065193 A | 3/2006 |
| JP | 2007-163954 A | 6/2007 |
| JP | 2009-175223 A | 8/2009 |
| JP | 2010-002743 A | 1/2010 |
| JP | 2011-158581 A | 8/2011 |
| JP | 5117519 B2 | 1/2013 |
| JP | 2014-092704 A | 5/2014 |
| JP | 2014-201489 A | 10/2014 |
| JP | 2015-086087 A | 5/2015 |
| TW | 201239437 A | 1/2012 |
| WO | WO 2006/025734 A1 * | 3/2006 |
| WO | WO2006/025734 A1 | 3/2006 |

OTHER PUBLICATIONS

European Patent Office, Extended European Search Report dated Jul. 23, 2019 in European Patent Application No. EP16870497.1, 8 pages.
WIPO, Japanese International Search Authority, International Search Report and Written Opinion dated Feb. 7, 2017 in International Patent Application No. PCT/JP2016/084554, 11 pages.
Chinese Third Office Action dated Oct. 19, 2020 in Chinese Application No. 201680068979.3, 13 pages with translation.

* cited by examiner

OPTICAL FIBER RIBBON AND OPTICAL FIBER CABLE

RELATED APPLICATIONS

This application claims priority under 35 U.S.C. § 111(a) as a Continuation application of PCT Application No. PCT/JP2016/084554, filed Nov. 22, 2016, entitled "OPTICAL FIBER RIBBON CORE-WIRE AND OPTICAL FIBER CABLE", which claims benefit of Japanese Patent Application No. JP2015-234441, filed Dec. 1, 2015, both of which are incorporated herein by reference in their entireties.

TECHNICAL FIELD

The present invention relates to an optical fiber ribbon and an optical fiber cable. More particularly, the present invention relates to an optical fiber ribbon in which adjacent colored optical fiber cores are intermittently connected to each other in a length direction by an intermittent connection and relates to an optical fiber cable provided with the optical fiber ribbon.

BACKGROUND ART

In recent years, with the growth of the Internet, Fiber To The Home or "FTTH" is in rapid expansion. FTTH provides high-speed communication service by drawing optical fibers directly to families. In general, an optical fiber cable used for FTTH includes a plurality of optical fiber ribbons (hereinafter, the optical fiber ribbon may be referred to as a "ribbon") bundled and housed therein. In order to draw an optical fiber from an optical fiber cable to a residence of FTTH user, it is required to intermediately branch the optical fiber cable, to extract a desired ribbon from the optical fiber cable, and to separate and extract a single fiber from the ribbon.

In order to facilitate separation of a single fiber and to provide a thinner diameter and higher density of an optical fiber cable, various optical fiber ribbons have been proposed (see, for example, Patent Literature 1). In an optical fiber ribbon, multiple optical fiber cores each of which includes an optical fiber protectively coated with an ultraviolet curable resin or the like are arranged planarly and connected in an integrated manner by a connection made of an ultraviolet curable resin or the like.

Currently used optical fiber ribbons are a 4-fiber ribbon, 8-fiber ribbon, 12-fiber ribbon, and 24-fiber ribbon, all of which have a compact configuration as wired optical fibers. When those optical fiber ribbons are formed into an optical fiber cable, it is possible to decrease the diameter of the cable and to increase the density thereof.

In Patent Literature 1; JP 5117519 B2, for example, adjacent optical fibers are intermittently connected to each other in a length direction (longitudinal direction), and adjacent connections in a ribbon-width direction are arranged alternately so as not to overlap each other. In this manner, as each ribbon is made by intermittently connecting the adjacent optical fibers in the length direction, when bundling a plurality of ribbons, the shape of the ribbons is changed easily, which leads to a decrease in diameter of an optical fiber cable and an increase in density thereof. Furthermore, each ribbon includes an unconnected portion (single-fiber portion), so that the ribbon can be separated relatively easily without a dedicated tool.

SUMMARY OF INVENTION

A plurality of optical fiber ribbons such as 4-fiber ribbons, 8-fiber ribbons, 12-fiber ribbons, and 24-fiber ribbons is collectively unitized and then used as an optical fiber cable. When the optical fiber cable is subjected to repetitive ironing or bending (hereinafter simply referred to as "ironing"), tensile stress and bending stress are generated in a colored optical fiber core and a connection (adhered portion) thereof which are disposed inside the optical fiber cable. Such stress may cause cracks of the connection or detachment of the connection from the colored optical fiber core.

The present invention has been made in light of the above problems. An object of the present invention is to provide an optical fiber ribbon and an optical fiber cable which are capable of maintaining advantages of the optical fiber ribbon such as reliable feasibility of intermediate branching and reliable workability at the time of collective connection, and which prevent cracks of a connection and detachment of the connection from a colored optical fiber core when the optical fiber cable is subjected to repetitive ironing, and which do not impair characteristics of the cable at the time of high-density cabling.

In order to solve the above problem, an optical fiber ribbon according to the present invention includes colored optical fiber cores arranged in parallel, wherein each of the colored optical fiber cores is formed with at least two cladding layers whose outermost layer is colored and which are formed around an optical fiber to cover the optical fiber, and the adjacent colored optical fiber cores are intermittently connected to each other in a length direction by an intermittent connection, wherein the intermittent connection contains a polyol having a weight-average molecular weight of 3000 to 4000 in an amount of 20 to 30 mass % relative to the entire intermittent connection, and the intermittent connection has Young's modulus at 23° C. over 40 MPa and under 170 MPa.

In the optical fiber ribbon according to the present invention, each of the colored optical fiber cores has a hysteresis value (α−β) exceeding 24 degrees, wherein the hysteresis value is a difference between an advancing contact angle α and a receding contact angle β with respect to pure water calculated by the Wilhelmy plate method.

In the optical fiber ribbon according to the present invention, the polyol contained in the intermittent connection is polypropylene glycol.

An optical fiber cable according to the present invention includes the optical fiber ribbon of the present invention.

In an optical fiber ribbon according to the present invention, adjacent colored optical fiber cores are intermittently connected in a length direction by an intermittent connection. The intermittent connection contains a polyol having a weight-average molecular weight of 3000 to 4000 in a specific amount relative to the entire intermittent connection and has Young's modulus at 23° C. within a specific range. Therefore, when collectively unitizing ribbons provided with a plurality of colored optical fiber cores to form an optical fiber cable, the present invention provides an optical fiber ribbon which is capable of maintaining advantages of the optical fiber ribbon such as reliable feasibility of intermediate branching and reliable workability at the time of collective connection, and which prevents cracks of the intermittent connection and detachment of the intermittent connection from each colored optical fiber core when the cable is subjected to repetitive ironing, and which does not impair characteristics of the cable at the time of high-density cabling. The present invention also provides an optical fiber cable provided with the optical fiber ribbon.

DESCRIPTION OF EMBODIMENTS

Figure 1:
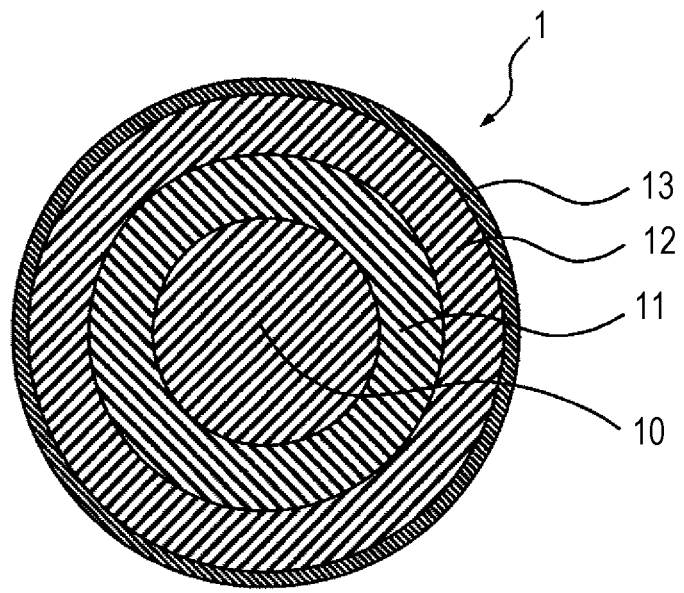
FIG. 1 is a cross-sectional view showing an example of a structure of a colored optical fiber core.

An aspect of the present invention will hereinafter be described. In an optical fiber ribbon 2 according to the present invention, colored optical fiber cores 1 are arranged in parallel. Each colored optical fiber core 1 is formed with at least two cladding layers around an optical fiber 10 to cover the optical fiber 10, and the outermost layer of these cladding layers are colored. The adjacent colored optical fiber cores 1 are intermittently connected to each other by an intermittent connection 3 in a length direction.

(I) Structure of Colored Optical Fiber Core 1

Figure 2:
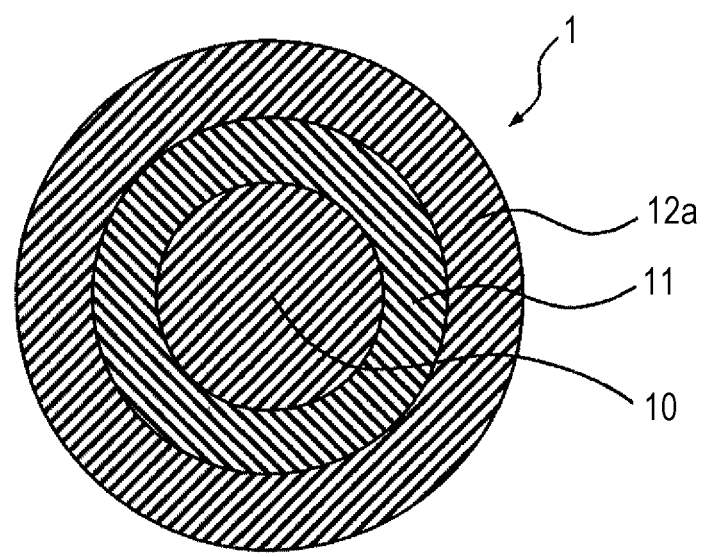
FIG. 2 is a cross-sectional view showing another example of the structure of the colored optical fiber core.

First, an aspect of the colored optical fiber core 1 included in the optical fiber ribbon 2 will be described. FIG. 1 is a cross-sectional view showing an example of a structure of the colored optical fiber core 1. FIG. 2 is a cross-sectional view showing another example of the structure of the colored optical fiber core 1. In FIGS. 1 and 2, the reference numerals 1, 10, 11, 12, 12a, and 13 respectively denote the colored optical fiber core, the optical fiber, a primary cladding layer, a secondary cladding layer, a colored secondary cladding layer (in FIG. 2), and a color layer (in FIG. 1).

In FIG. 1, the colored optical fiber core 1 includes the following members in the order mentioned: the primary cladding layer 11 (primary layer) formed around the optical fiber 10 which is a glass optical fiber or the like, the secondary cladding layer 12 (secondary layer) which is colored and formed around the primary cladding layer 11, and the color layer 13 formed around the secondary cladding layer 12. The color layer 13 is the outermost layer of the colored optical fiber core 1.

On the other hand, in FIG. 2, the colored optical fiber core 1 includes the following members in the order mentioned: the primary cladding layer 11 formed around the optical fiber 10, and the secondary cladding layer 12a which is colored and formed around the primary cladding layer 11.

The colored secondary cladding layer 12a is the outermost layer of the colored optical fiber core 1. Hereinafter, the color layer 13 and the colored secondary cladding layer 12a serving as the outermost layer of the colored optical fiber core 1 may be collectively referred to as "the color layer 13 and the like".

(II) Structure of Optical Fiber Ribbon 2

Figure 3:
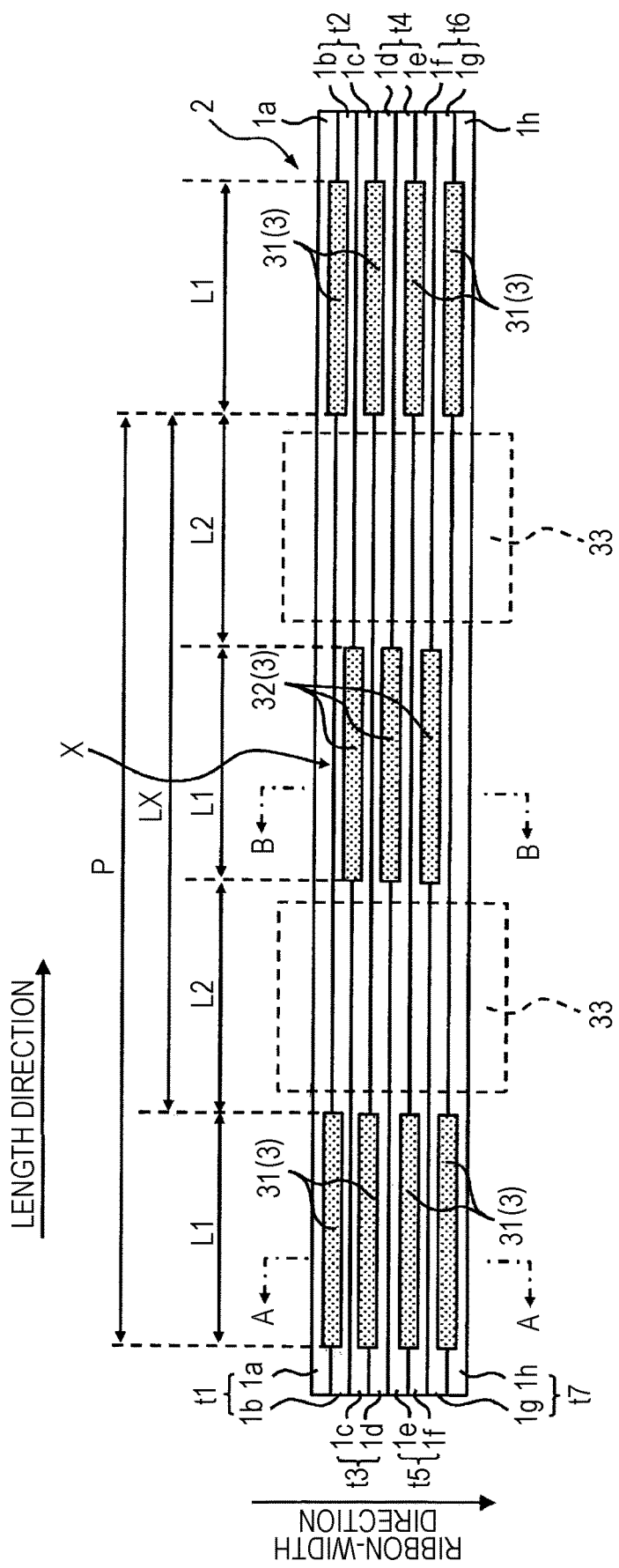
FIG. 3 is a front view showing an aspect of an optical fiber ribbon.
Figure 4:
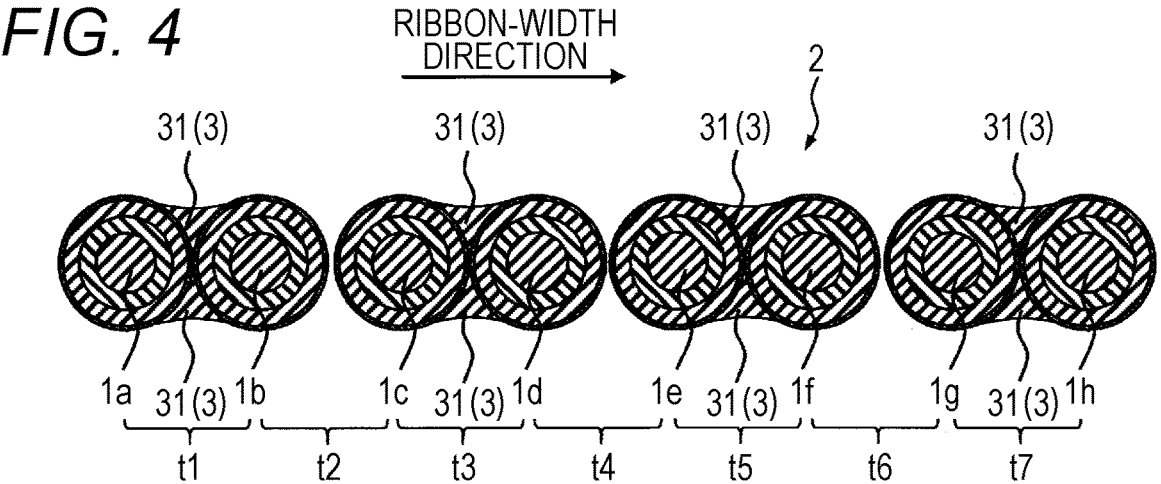
FIG. 4 is a view showing a connected state of the optical fiber ribbon.
Figure 5:
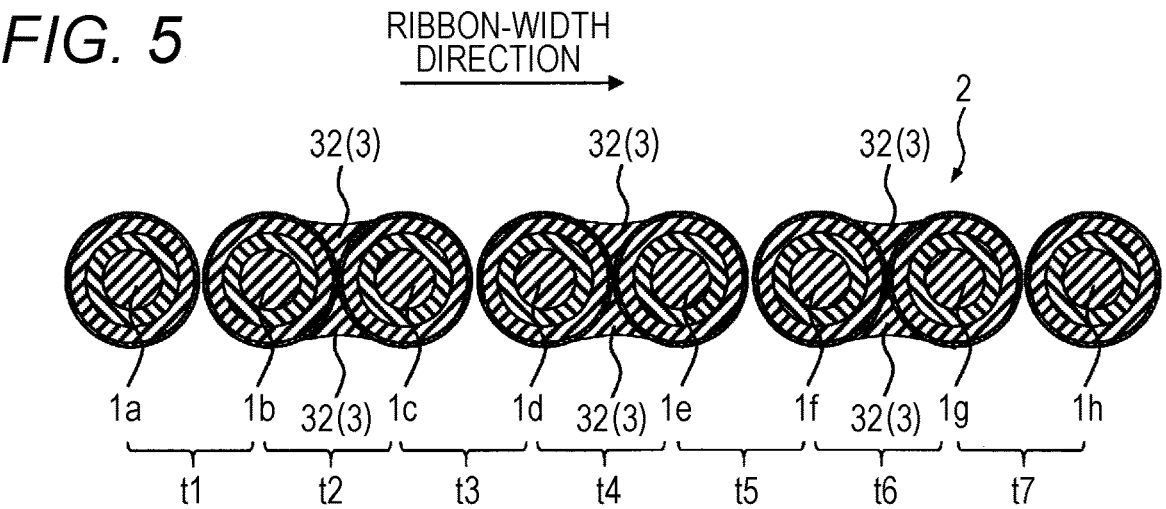
FIG. 5 is a view showing a connected state of the optical fiber ribbon.

FIG. 3 is a front view showing an aspect of the optical fiber ribbon 2. FIGS. 4 and 5 are views showing a connected state of the optical fiber ribbon 2 (FIG. 4 is a cross-sectional view taken along line A-A of FIG. 3 including intermittent connections 31, and FIG. 5 is a cross-sectional view taken along line B-B of FIG. 3 including intermittent connections 32). For the sake of convenience, in FIGS. 3 to 5, the optical fiber ribbon 2 is illustrated as an 8-fiber ribbon including eight colored optical fiber cores 1.

As shown in FIGS. 3 to 5, the intermittently-connected optical fiber ribbon 2 is configured in such a manner that the adjacent colored optical fiber cores 1 arranged in parallel are intermittently connected to each other by the intermittent connections 3 in the length direction. As the parallelly-arranged colored optical fiber cores 1 are intermittently provided with the connections (intermittent connections 3), the colored optical fiber cores 1 are connected in an integrated manner, which improves unitization and handiness of the colored optical fiber cores 1 and ensures intermediate branching, simple laying operation, and shorter working hours.

In the optical fiber ribbon 2, the 8-fiber ribbon as shown in FIG. 3, a pair of colored optical fiber cores t1 includes colored optical fiber cores 1a and 1b which are intermittently connected to each other by the intermittent connections 31 in the length direction (see FIG. 3). In the pair of colored optical fiber cores t1, the adjacent intermittent connections 31 are provided at an equal interval, and the length of the intermittent connections 31 is made equal. Such a structure is common to a pair of colored optical fiber cores t3 including colored optical fiber cores 1c and 1d, a pair of colored optical fiber cores t5 including colored optical fiber cores 1e and 1f, and a pair of colored optical fiber cores t7 including colored optical fiber cores 1g and 1h.

In these four pairs of colored optical fiber cores t1, t3, t5, and t7, the intermittent connections 31 are arranged equally in a ribbon-width direction (see FIG. 3). Therefore, unconnected portions 33 of the four pairs of colored optical fiber cores t1, t3, t5, and t7 (parts with a single fiber and without the intermittent connection 3 (single-fiber portions) which are, for example, surrounded by dotted lines in FIG. 3) are also positioned equally as viewed in the ribbon-width direction.

Furthermore, a pair of colored optical fiber cores t2 includes colored optical fiber cores 1b and 1c which are intermittently connected to each other by intermittent connections 32 in the length direction. The adjacent intermittent connections 32 are provided at an equal interval, and the length of the intermittent connections 32 is made equal. Such a structure is common to a pair of colored optical fiber cores t4 including colored optical fiber cores 1d and 1e, and a pair of colored optical fiber cores t6 including colored optical fiber cores 1f and 1g.

In these three pairs of colored optical fiber cores t2, t4, and t6, the intermittent connections 32 are arranged equally in the ribbon-width direction. Therefore, the unconnected portions 33 of the three pairs of colored optical fiber cores t2, t4, and t6 are also positioned equally as viewed in the ribbon-width direction.

As described above, with regard to adjacent (two) colored optical fiber cores 1 in the intermittently-connected optical fiber ribbon 2, the intermittent connections 31, 32 and the unconnected portions 33 are alternately arranged at predetermined length in the length direction, and the adjacent colored optical fiber cores 1 are intermittently connected by the intermittent connections 3 in the length direction (for example, see the pair of colored optical fiber cores t1 including the colored optical fiber cores 1a and 1b, and the pair of colored optical fiber cores t2 including the colored optical fiber cores 1b and 1c shown in FIG. 3).

In addition, as shown in FIG. 3 to FIG. 5, with regard to the pairs of colored optical fiber cores t1 to t7 including adjacent (two) optical fibers formed with the intermittent connections 31 and 32, both sides (outer side) in the ribbon-width direction of parts formed with the intermittent connections 3 are not connected (for example, the pair of colored optical fiber cores t3 including the colored optical fiber cores 1c and 1d shown in FIG. 4 is formed with the intermittent connections 31 that connect the two fibers, the colored optical fiber cores 1c and 1d, meanwhile, both sides (outside) in the ribbon-width direction of parts formed with the intermittent connections 3 are not connected).

With regard to the 8-fiber ribbon as shown in FIG. 3, for example, a length L1 of the intermittent connections 31 and 32 in the optical fiber ribbon 2 is preferably about 5 mm to 35 mm but are not particularly limited to this range. A length L2 of the unconnected portions 33 commonly positioned in the ribbon-width direction (a length between the intermittent connection 31 and the intermittent connection 32 adjacent thereto in the length direction as shown in FIG. 3) is preferably about 5 mm to 15 mm but is not particularly limited to this range. Furthermore, a pitch P in the optical fiber ribbon 2 (the "pitch" represents the length from the intermittent connection 31 to the adjacent intermittent connection 31 in the length direction (or from the intermittent connection 32 to intermittent connection 32), and in FIG. 3, the pitch represents the length from the intermittent connection 31 to intermittent connection 31) is preferably 100 mm or less, and more preferably about 20 mm to 90 mm, but the pitch P is not particularly limited to this range.

In FIG. 3, the intermittent connections 3 are commonly positioned as viewed in the ribbon-width direction, and the unconnected portions 33 are also commonly positioned as viewed in the ribbon-width direction. With regard to the unconnected portions, each represents a part with a single fiber without the intermittent connection 3 (a single-fiber portion), and for example, the letter X shown in FIG. 3 (and FIGS. 8 and 11 to be described later) corresponds to a unconnected portion (the unconnected portion X having a length LX). Herein, the length (the length in the length direction between two intermittent connections 31) LX of the unconnected portion X in a pair of colored optical fiber cores (for example, the pair of colored optical fiber cores t1) is preferably about 15 mm to 55 mm but is not particularly limited to this range.

(III) Intermittent Connection 3

The intermittent connection 3 shown in FIG. 3 and the like can be formed, for example, by curing the following component. In the present invention, the component of in the intermittent connection 3 contains a polyol having a weight-average molecular weight (Mw) of 3,000 to 4,000. The polyol having such a weight-average molecular weight (hereinafter the weight-average molecular weight may be simply referred to as "molecular weight") exists without reacting with the network of an ultraviolet curable resin included in the intermittent connection 3. As the polyol swells in the dense network of the ultraviolet curable resin, the intermittent connection 3 plays a role as a plasticizer for the ultraviolet curable resin. The presence of the polyol in the intermittent connection 3 as described above moderates Young's modulus of the intermittent connection 3 and imparts flexibility and stretchability to the intermittent connection 3 even with low temperatures. In addition, the presence of the polyol on the surface suppresses frictions between optical fiber units 21 and prevents loss increase in an ironing test or temperature characteristics of an optical fiber cable 4 (see FIG. 7).

As long as the polyol has a weight-average molecular weight within the above range, the molecular weight is larger than that of the color layer 13 of the colored optical fiber core 1, so that the polyol does not pass through the network of the color layer 13 and does not transfer. Furthermore, the molecular weight of the polyol is as large as 3000 to 4000, so that the Young's modulus of the intermittent connection 3 can be controlled by increasing a contained amount of the polyol.

Examples of the polyol include polypropylene glycol, polyethylene glycol, and polytetramethylene glycol. Among these examples, polyethylene glycol and polytetramethylene glycol which do not have a branched structure may crystallize at low temperatures. Such crystallization may cause bending at an interface between the color layer 13 and the intermittent connection 3 and may cause the loss increase. On the other hand, polypropylene glycol having a branched structure does not crystallize even at a low temperature of −60° C. and reliably exhibits the effect of the polyol. Accordingly, it is preferable to use polypropylene glycol as the polyol. Polypropylene glycol is produced by additive polymerization of polypropylene oxide (PO) to a polyfunctional alcohol using an alkali catalyst. In order to enhance a reaction, ethylene oxide (EO) may be additionally polymerized, but in some cases, adding ethylene oxide causes high hydrophilicity, so that it is preferable to use polypropylene oxide (PO) as an additional substance.

As described above, the weight-average molecular weight of the polyol contained in the intermittent connection 3 is 3000 to 4000. The polyol having a weight-average molecular weight less than 3000 may cause the polyol to transfer as passing through the color layer 13 which is in contact with the intermittent connection 3. In forming the optical fiber cable 4, such a polyol may transfer to a buffer layer 42 or a cladding layer (sheath) 46 of the optical fiber cable 4 which is in contact with the intermittent connection 3. Due to such transfer of the polyol, the effect may not be exerted.

On the other hand, the polyol having a weight-average molecular weight over 4000 increases viscosity when being mixed with the ultraviolet curable resin and decreases an amount of application to the intermittent connection 3 at the time of production, which may cause adhesion failure. In order to increase the amount of application, the viscosity may be decreased, for example, by raising a heating temperature, but an excessively high heating temperature increases the amount of resin, which may be a factor to increase the thickness of the intermittent connection 3. It should be noted that the weight-average molecular weight of the polyol may be a value measured by a method such as gel permeation chromatograph (GPC) in which a molecular weight distribution, an average molecular weight distribution, and the like of a known polymer substance are measured.

A contained amount of the polyol in the intermittent connection 3 is 20 to 30 mass % relative to the entire intermittent connection 3 (the whole components of the intermittent connection 3). When a contained amount of the polyol relative to the entire intermittent connection 3 is within the range, the Young's modulus of the intermittent connection 3 is easily maintained within a range over 40 MPa and under 170 MPa.

In addition, as long as the contained amount of the polyol falls within such a range, the stretchability of the intermittent connection 3 is easily maintained at approximately 30% or more, and the tensile strength is easily maintained at approximately 8 MPa or more. Accordingly, as will be described later, a hysteresis value ($\alpha-\beta$), which is obtained by subtracting a receding contact angle from an advancing contact angle of the colored optical fiber core 1, is made to exceed 24 degrees. Furthermore, it is possible to prevent cracks of the intermittent connection 3 and detachment of the intermittent connection 3 from the colored optical fiber core 1 in the ironing test. In the "ironing test" herein, the optical fiber ribbon 2 is formed into a cable, and when the optical fiber ribbon 2 is subjected to ironing (bending load and the like under constant tension), degradation of characteristics of the cable and the like are determined.

On the other hand, when a contained amount of the polyol relative to the entire intermittent connection 3 is less than 20 mass %, the flexibility and stretchability at the time of unitization are not satisfactory, and when the intermittent connection 3 is subjected to ironing, the intermittent connection 3 has an elevated risk for generating cracks. Furthermore, a contained amount of the polyol over 30 mass % may cause detachment of the intermittent connection 3 from the colored optical fiber core 1 at the time of ironing. A contained amount of the polyol in the intermittent connection 3 is preferably 23 to 30 mass % relative to the entire intermittent connection 3.

As other components included in the intermittent connection 3, usable examples include those typically used as components of an ultraviolet curable resin covering the optical fiber 10 and an additive component thereof. Specifically, usable examples include an oligomer, diluent monomer, photo initiator, silane coupling agent, sensitizer, pigment, and other various additives.

Usable examples of the oligomer include a polyether urethane acrylate, epoxy acrylate, polyester acrylate, and silicone acrylate. One of these oligomers may be used singly, and two or more of them may be used in combination. The Young's modulus and glass-transition temperature (Tg) of the entire intermittent connection 3 can be adjusted by the skeleton structure and molecular weight of the oligomer, and types and additive amount of a diluent monomer to be described later. As will be described later, the Young's modulus can be adjusted by decreasing the molecular weight of the oligomer or by increasing a functional group of a monomer.

When a polyether urethane acrylate is used as the oligomer, a polyol such as polypropylene glycol, polyethylene glycol, polytetramethylene glycol may be used as a middle block, and polypropylene glycol having a branched structure is preferably used. Furthermore, it is preferable to use an oligomer that includes such polypropylene glycol as a middle block and that has, as a skeletal component, hydroxy groups at both terminals to which a hydroxy compound having an unsaturated double bond reactive to ultraviolet light is bonded through an aromatic isocyanate.

It is preferable to use polypropylene glycol as the polyol, and as the oligomer, it is preferable to use an oligomer including polypropylene glycol as a middle block from a viewpoint of effectively preventing crystallization at low temperatures since the use of those components do not lead to crystallization even at a low temperature of −60° C. The oligomer to be used herein preferably has a weight-average molecular weight of 500 to 2500, and more preferably, 1000 to 2000.

A usable example of an aromatic isocyanate includes an aromatic diisocyanate such as tolylene diisocyanate (TDI), and isophorone diisocyanate (IPDI). A usable example of the hydroxy compound includes hydroxyethyl acrylate (HEA).

Using the oligomer independently may lead to extremely high viscosity so that a diluent monomer may be compounded, primarily intending to adjust the viscosity. Usable examples of the diluent monomer include a monofunctional monomer, bifunctional monomer, and polyfunctional monomer.

Examples of the monofunctional monomer used as the diluent monomer addable to the oligomer include PO-modified nonylphenol acrylate, isobornyl acrylate, 2-ethylhexyl acrylate, isononyl acrylate, isodecyl acrylate, polyethylene glycol acrylate, N-vinylpyrrolidone, N-vinylcaprolactam, and lauryl acrylate. Examples of the bifunctional monomer and polyfunctional monomer include 1,6-hexanediol diacrylate, bisphenol A epoxy acrylate, tripropylene glycol diacrylate, tricyclodecanedimethylol diacrylate, EO-modified bisphenol A diacrylate, and hexanediol diacrylate. One of these monomers may be used singly, and two or more of them may be used in combination. It should be noted that monofunctional monomers have a profound effect on decreasing Young's modulus, compared to bifunctional monomers and polyfunctional monomers. This is because monofunctional monomers have a greater effect of reducing crosslinking points in a molecular structure than bifunctional monomers and polyfunctional monomers.

Upon absorption of ultraviolet light, the photo initiator becomes radical and capable of continuously polymerizing the unsaturated double bond of the reactive oligomer and the reactive monomer. Usable examples of the photo initiator include 1-hydroxy-cyclohexyl-phenyl-ketone, 2-hydroxy-2-methyl-1-phenyl-propane-1-one, 2,4,6-trimethylbenzoyl-diphenyl-phosphine oxide, and bis(2,4,6-trimethylbenzoyl)-phenylphosphine oxide as an alkylphenone-based photopolymerization initiator, and an acylphosphine oxide-based photopolymerization initiator. One of these photo initiators may be used singly, and two or more of them may be used in combination.

Suitable examples of the sensitizer include a triplet sensitizer such as thioxanthones and benzophenones. Particularly, thioxanthones are effective because of the long lifetime of a triplet state and are usable in combination.

Examples of other additives that can be added include an antioxidant, ultraviolet absorber, light stabilizer such as a hindered amine light stabilizer, deterioration inhibitor such as a thermal polymerization inhibitor, silane coupling agent, leveling agent, hydrogen absorber, chain transfer agent, silicone, and lubricant.

Furthermore, the intermittent connection 3 may be colored. Examples of the pigment to be added when coloring the intermittent connection 3 include an organic pigment such as phthalocyanine, quinacridone, dioxazine, and benzimidazolone, and an inorganic pigment such as carbon black, and titanium oxide. As a coloring component, a colorant obtained by mixing a pigment and an ultraviolet curable resin and the like typified by the aforementioned materials may be used. A contained amount of the colorant may be appropriately determined depending on materials of the intermittent connection 3, a contained amount of the pigment in the colorant, and types of other components such as the ultraviolet curable resin and the like. However, a contained amount of the colorant is preferably 0.5 to 3.0 mass %, and particularly preferably 1.5 to 2.5 mass % relative to the entire intermittent connection 3. When producing the optical fiber ribbon 2, coloring the intermittent connection 3 enables continuous monitoring of the adhesion between the optical fiber ribbon 2 and the intermittent connection 3 in the production line.

In the optical fiber ribbon 2 according to the present invention, the Young's modulus of the intermittent connection 3 at 23° C. (hereinafter the Young's modulus at 23° C. may be simply referred to as the "Young's modulus") is over 40 MPa and under 170 MPa. Setting the Young's modulus at 23° C. to such a range moderates rigidity and the like of the intermittent connection 3, and even when the optical fiber ribbon 2 is formed into a cable or subjected to the ironing test, it is possible to prevent cracks of the intermittent connection 3 and detachment of the intermittent connection 3 from the colored optical fiber core 1. On the other hand, the Young's modulus of 40 MPa or less may cause detachment of the intermittent connection 3 from the colored optical fiber core 1 when the optical fiber ribbon 2 is formed into a cable and subjected to ironing, and the Young's modulus of 170 MPa or more may cause cracks of the intermittent connection 3. The Young's modulus at 23° C. of the intermittent connection 3 included in the optical fiber ribbon 2 is preferably 41 to 140 MPa, and particularly preferably 70 to 140 MPa.

The Young's modulus of the intermittent connection 3 can be adjusted within the range by adjusting, for example, components and the like of the intermittent connection 3. Specifically, the Young's modulus (and the glass-transition temperature (Tg)) of the intermittent connection 3 can be adjusted by conditions for ultraviolet curing such as types, weight-average molecular weight, and contained amount of the polyol included in the intermittent connection 3, types, molecular weight, and contained amount of the oligomer, types, and additive amount of the diluent monomer, types, contained amount of other components, and radiation amount.

Generally, the Young's modulus tends to increase due to, for example, a decrease in weight-average molecular weight of the polyol in the intermittent connection 3 or due to a reduction in contained amount of the polyol. In the present invention, the Young's modulus is adjusted by adjusting the weight-average molecular weight and contained amount of the polyol relative to the entire intermittent connection 3 within the ranges. Furthermore, the Young's modulus increases by decreasing the molecular weight of the oligomer or by increasing the contained amount of the diluent monomer to be added or the number of functional groups. Therefore, the Young's modulus may be adjusted using these conditions as parameters. However, such cases lead to high crosslinking density and more shrinkage, which may adversely affect the adhesion with the color layer 13 and the like, so that it is preferable to adjust the Young's modulus in consideration of balance of those parameters.

It should be noted that the glass-transition temperature (Tg) of the intermittent connection 3 is preferably, for example, 40 to 60° C. on the high temperature side, and particularly preferably 45 to 55° C.

(IV) Primary Cladding Layer 11, Secondary Cladding Layer 12, Colored Secondary Cladding Layer 12a, and Color Layer 13

Since transmission loss of the optical fiber 10 increases by various external stresses and micro bends accompanying such stresses, it is required to protect the optical fiber 10 from such external stresses. Therefore, the optical fiber 10 is generally coated with a protective layer having a structure with two layers: the primary cladding layer 11, and the secondary cladding layer 12. For example, in a case where the optical fiber 10 is a glass optical fiber, the primary cladding layer 11 corresponds to an inner layer which is in contact with silica glass of the glass optical fiber and includes soft resin having relatively low Young's modulus, and the primary cladding layer 11 is coated with the secondary cladding layer 12 which serves as an outer layer and includes hard resin having relatively high Young's modulus.

With regard to resin materials included in the primary cladding layer 11 (primary layer) and the secondary cladding layer 12 (secondary layer) of the colored optical fiber core 1, and with regard to materials of the color layer 13 of the colored optical fiber core 1, usable examples include components of the aforementioned various additives such as an oligomer, diluent monomer, photo initiator, silane coupling agent, sensitizer, pigment (and a colorant in which a pigment and an ultraviolet curable resin and the like are mixed), lubricant, all of which are ultraviolet curable resins recited as the components of the intermittent connection 3 and additives thereof.

With regard to the primary cladding layer 11 and the secondary cladding layer 12, a preferable example of the oligomer is an oligomer in which an aromatic isocyanate and hydroxyethyl acrylate are added to a polyol including polypropylene glycol which is similar to the oligomer of the intermittent connection 3, and Young's modulus can be adjusted by changing the molecular weight of the polyol (polypropylene glycol) serving as a middle block. The oligomer to be used preferably has a weight-average molecular weight of 1000 to 4000 when used as the primary cladding layer 11, and preferably 500 to 2000 when used as the secondary cladding layer 12, and preferably 500 to 2000 when used as the color layer 13, and preferably 500 to 2000 when used as the colored secondary cladding layer 12a.

Specifically, with regard to the primary cladding layer 11 and the secondary cladding layer 12, it is preferable to use polypropylene glycol as the polyol, and as the oligomer, it is preferable to use an oligomer in which the polypropylene glycol serves as the middle block from a viewpoint of effectively preventing crystallization at low temperatures since the use of those components do not lead to crystallization even at a low temperature of −60° C. A usable example of the aromatic isocyanate includes an aromatic diisocyanate such as tolylene diisocyanate (TDI), and isophorone diisocyanate (IPDI). A usable example of the hydroxy compound includes hydroxyethyl acrylate (HEA). Using the oligomer independently may lead to extremely high viscosity so that a diluent monomer may be compounded, primarily intending to adjust the viscosity. Usable examples of the diluent monomer include a monofunctional monomer, bifunctional monomer, and polyfunctional monomer. Examples of the monofunctional monomer addable as the diluent monomer include PO-modified nonylphenol acrylate, isobornyl acrylate, 2-ethylhexyl acrylate, isononyl acrylate, isodecyl acrylate, polyethylene glycol acrylate, N-vinylpyrrolidone, and N-vinylcaprolactam. Examples of the bifunctional monomer and polyfunctional monomer include 1,6-hexanediol diacrylate, bisphenol A epoxy acrylate, tripropylene glycol diacrylate, and tricyclodecanedimethylol diacrylate. One of these monomers may be used singly, and two or more of them may be used in combination.

It should be noted that monofunctional monomers have a profound effect on decreasing Young's modulus, compared to bifunctional monomers and polyfunctional monomers. This is because monofunctional monomers have a greater effect of reducing crosslinking points in a molecular structure than bifunctional monomers and polyfunctional monomers. Upon absorption of ultraviolet light, the photo initiator becomes radical and capable of continuously polymerizing the unsaturated double bond of the reactive oligomer and the reactive monomer. Usable examples of the photo initiator include an alkylphenone-based photopolymerization initiator, and an acylphosphine oxide-based photopolymerization initiator. One of these photo initiators may be used singly, and two or more of them may be used in combination.

Furthermore, with regard to the oligomer included in the color layer 13, as similar to the primary cladding layer 11 and the secondary cladding layer 12, a preferable example is an oligomer in which an aromatic isocyanate and hydroxyethyl acrylate are added to a polyol including polypropylene glycol, and Young's modulus can be adjusted by changing the molecular weight of the polyol (polypropylene glycol) serving as a middle block or by a bifunctional monomer or polyfunctional monomer. Usable examples of the resin of the color layer 13 include urethane acrylate, and hydroxypivalic acid neopentyl glycol acrylic acid adduct. Furthermore, addition of bisphenol A epoxy acrylate or the like enhances toughness of the color layer 13. When the colored secondary cladding layer 12a doubles as the color layer 13, the colored secondary cladding layer 12a may include these components.

Specifically, with regard to the oligomer, a preferable example is an oligomer in which an aromatic isocyanate and hydroxyethyl acrylate are added to a polyol including polypropylene glycol, and Young's modulus can be adjusted by changing the molecular weight of the polyol (polypropylene glycol) serving as a middle block or by a bifunctional monomer or polyfunctional monomer. Addition of bisphenol A epoxy acrylate or the like as the oligomer enhances toughness. In addition, urethane acrylate, hydroxypivalic acid neopentyl glycol acrylic acid adduct, and the like may also be used. Furthermore, in order to improve slipperiness of the surface, it is preferable to add a modified silicone such as a both terminal-acrylic modified silicone, one terminal-acrylic modified silicone, and side chain-acrylic modified silicone. Usable examples of the photo initiator include 2-methyl-1-(4-methylthiophenyl)-2-morpholinopropane-1-one, 2-benzyl-2-dimethylamino-1-(4-morpholinophenyl)-butanone-1,2,4-diethylthioxanthone, 2,4,6-trimethylbenzoyl-diphenyl-phosphine oxide, and 1-hydroxy-cyclohexyl-phenyl-ketone.

As shown in FIG. 2, when the colored secondary cladding layer 12a serves as the outermost layer of the colored optical fiber core 1 and when the secondary cladding layer 12 doubles as the color layer 13, a pigment or the colorant is added to the secondary cladding layer 12 so as to obtain the colored secondary cladding layer 12a. A contained amount of the colorant in the color layer 13 and the like may be appropriately determined based on materials of the color layer 13, contained amount of the pigment in the colorant, and types or the like of other components such as the ultraviolet curable resin.

In the colored optical fiber core 1 according to the present invention, the hysteresis value ($\alpha-\beta$), which is obtained by a difference ($\alpha-\beta$) between the advancing contact angle $\alpha$ and the receding contact angle $\beta$ (the dynamic contact angles) with respect to pure water calculated by the Wilhelmy plate method, preferably exceeds 24 degrees. As the hysteresis value of the colored optical fiber core 1 exceeds 24 degrees, the surface of the colored optical fiber core 1 is easily adhered to an object to be connected (the intermittent connection 3), so that the colored optical fiber core 1 and the intermittent connection 3 are firmly joined and connected. Therefore, it is possible to prevent detachment or the like of the intermittent connection 3 from the colored optical fiber core 1 when the optical fiber ribbon 2 is formed into a cable and subjected to repetitive ironing. On the other hand, when the hysteresis value of the colored optical fiber core 1 is at 24 degrees or less, the surface of the colored optical fiber core 1 may be slippery, so that the intermittent connection 3 may be detached from the colored optical fiber core 1.

Figure 6:
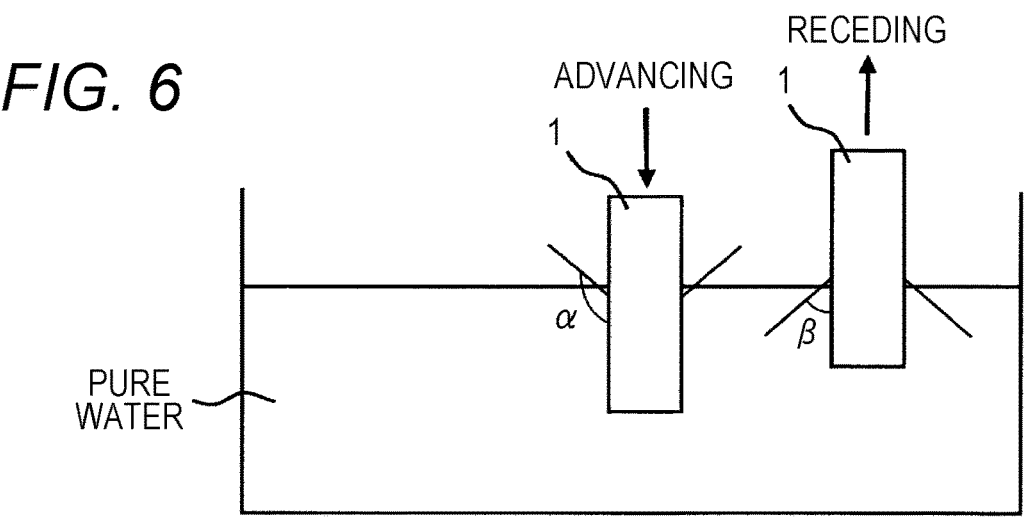
FIG. 6 is an illustration diagram on a method of measuring dynamic contact angles of the colored optical fiber core.

The dynamic contact angles of the colored optical fiber core 1 such as the advancing contact angle $\alpha$ and the receding contact angle $\beta$ may be measured under predetermined conditions (for example, temperature at 23° C., and humidity of 55%). Measuring the force when immersing the colored optical fiber core 1 into pure water and retracting the same from the pure water, the contact angles may be determined from surface free energy of the liquid. FIG. 6 is an illustration diagram on a method of measuring the dynamic contact angles of the colored optical fiber core 1. The colored optical fiber core 1 to be measured is fixed to a probe of an automatic tensiometer (not shown) with a double-faced tape (not shown). A contact angle when the colored optical fiber core 1 is immersed at a constant rate in pure water having known surface tension is defined as the advancing contact angle $\alpha$, and conversely, a contact angle when the colored optical fiber core 1 is retracted from the liquid at a constant rate is defined as the receding contact angle $\beta$.

Herein, the advancing contact angle $\alpha$ indicates water absorbency (wettability), and the receding contact angle $\beta$ indicates water repellency. A difference between these angles is the hysteresis value ($\alpha-\beta$) that represents a change in surface condition. The hysteresis value indicates transferability of a polar group and non-polar group. In general, a high hysteresis value makes the surface grippy, which enhances adhesion with an object to be adhered.

The hysteresis value represented by the difference ($\alpha-\beta$) of the dynamic contact angles can be adjusted, for example, by controlling an amount of ultraviolet radiation, illuminance, oxygen concentration atmosphere, and the like when curing the outermost layer (the color layer 13 or the colored secondary cladding layer 12a) of the colored optical fiber core 1.

With constant illuminance, the hysteresis value represented by the difference ($\alpha-\beta$) of the dynamic contact angles tends to increase with an increase in oxygen concentration at the time of curing. With a constant oxygen concentration, the hysteresis value tends to increase with a decrease in amount of radiation at the time of curing (or a decrease in illuminance). An unreacted group (non-polar group) of the ultraviolet curable resin composition due to oxygen inhibition and a hydroxy group (polar group) formed by incorporation of oxygen exist on the surface of the ultraviolet curable resin composition cured under high oxygen concentration atmosphere. Furthermore, even with a small amount of radiation, the unreacted group of the ultraviolet curable resin composition exists on the surface. Such surface states vary depending on surrounding environments. In the air, the non-polar group (unreacted group) covers the surface, and conversely, in water, the polar group (hydroxy group) transfers to the surface. With a high oxygen concentration, or with a low amount of ultraviolet radiation (low illuminance), or with a low curing temperature, a cure degree of the surface decreases.

In such a state, the advancing contact angle becomes high, which represents low water absorbency, and the receding contact angle becomes low, which represents low water repellency. For example, while the double bond remains on the surface with an oxygen concentration of 0.01 to 5%, (the materials of) the intermittent connection 3 is applied to the colored optical fiber core 1 and cured so that the surface of the color layer 13 and the like are strongly bonded to the intermittent connection 3.

As described above, in order to obtain good bonding force and the like, the hysteresis value represented by the difference ($\alpha-\beta$) of the dynamic contact angles is made to exceed 24 degrees, and in order to make it exceed 24 degrees, it is efficient to moderately increase the oxygen concentration when curing the color layer 13 and the like or moderately decrease the amount of ultraviolet radiation (moderately decrease the illuminance).

On the other hand, excessively decreasing surface curability of the material included in the color layer 13 and the like softens the surface of the colored optical fiber core 1 so that the colored optical fiber core 1 becomes vulnerable and that the frictional force of the color layer 13 and the like becomes high. Such problems may cause winding failure or the like when winding the colored optical fiber core 1 around a bobbin. In consideration of preventing such winding failure or the like, the hysteresis value, the difference ($\alpha-\beta$) of the dynamic contact angles, is made to exceed 24 degrees, preferably from 25 to 60 degrees, and more preferably from 25 to 40 degrees.

In addition to the above factors, the hysteresis value of the colored optical fiber core 1 may be adjusted by the materials (such as silicone and photo initiator) of the outermost layer (the color layer 13 or the colored secondary cladding layer 12a) of the colored optical fiber core 1, illuminance of ultraviolet light, production temperature, and the like.

When pure water is used as the liquid, the advancing contact angle and the receding contact angle are calculated by the Wilhelmy plate method, considering the surface tension of pure water as 72.8. For details of the Wilhelmy plate method, see, for example, *Wettability Technology Handbook—Fundamentals, Measurement valuation, Data-* (Ishii Yoshio et al., Techno Systems Inc., Oct. 25, 2001, pp. 6-9, pp. 483-485, and so on). As an instrument for measuring the dynamic contact angles, an automatic tensiometer (K100, manufactured by KRUSS) or the like may be used. Since the surface state of the colored optical fiber core 1 also varies depending on surrounding environments, it is preferable to adjust the surface state of the colored optical fiber core 1 under the following environment before measuring the dynamic contact angles: the temperature at 23° C., and the humidity of 55%.

The Young's modulus at 23° C. of the primary cladding layer 11 included in the colored optical fiber core 1 is preferably about 0.3 to 1.5 MPa. The Young's modulus at 23° C. of the secondary cladding layer 12 is preferably about 500 to 1500 MPa. The Young's modulus at 23° C. of the color layer 13 is preferably about 1000 to 2500 MPa. When the secondary cladding layer 12 doubles as the color layer 13, the Young's modulus at 23° C. of the colored secondary cladding layer 12a is preferably 500 to 1500 MPa.

In order to maintain characteristics as an optical fiber element (refer to the description below), with regard to an outer diameter of each layer in the colored optical fiber core 1, generally, it is preferable that the outer diameter of the optical fiber 10 is 80 μm to 125 μm, the outer diameter of the primary cladding layer 11 is 120 μm to 200 μm, the outer diameter of the secondary cladding layer 12 is 160 μm to 242 μm, and the outer diameter of the color layer 13 is 173 μm to 255 μm. As shown in FIG. 2, when the secondary cladding layer 12 doubles as the color layer 13, the colored secondary cladding layer 12a preferably has an outer diameter 160 μm to 255 μm.

(V) Production Method of Optical Fiber Ribbon 2

Hereinafter described is an example of a production method of the optical fiber ribbon 2 according to the present invention. In the following description, a glass optical fiber 10 will be illustrated as the optical fiber 10, and a silica glass optical fiber (glass optical fiber 10) coated with the primary cladding layer 11 and the secondary cladding layer 12 is referred to as the optical fiber element.

In order to produce the colored optical fiber core 1, for example, first, a preform containing silica glass as the main component is heated and fused by a wire drawing furnace so as to obtain an optical fiber made of silica glass (glass optical fiber 10). Next, a component containing a liquid ultraviolet curable resin is applied to the glass optical fiber 10 by a coating die, and then, the applied component containing the ultraviolet curable resin is irradiated with ultraviolet light with an ultraviolet irradiation device (UV irradiation device) so that the component is cured. In this manner, the optical fiber element with the glass optical fiber 10 covered with the primary cladding layer 11 and the secondary cladding layer 12 is produced. After wire drawing, the periphery of the glass optical fiber 10 is immediately covered with the component containing the ultraviolet curable resin to form the primary cladding layer 11 and the secondary cladding layer 12, which prevents strength reduction of the optical fiber element obtained.

In the next step, the periphery of the optical fiber element obtained is covered with the color layer 13 so as to produce the colored optical fiber core 1. As described above, the secondary cladding layer 12 may be colored so that the colored optical fiber core 1 is configured to include the colored secondary cladding layer 12a as the outermost layer. Furthermore, it is preferable to control an amount of ultraviolet radiation, illuminance, oxygen concentration atmosphere, and the like at the time of curing so that the hysteresis value in the outermost layer (the color layer 13 or the colored secondary cladding layer 12a) falls within a predetermined range.

A desired number of colored optical fiber cores 1 obtained are aligned, and the materials of the intermittent connection 3 are applied to the colored optical fiber cores 1 in a predetermined pattern and cured under predetermined conditions to form the intermittent connection 3, whereby yielding the optical fiber ribbon 2.

The optical fiber ribbon 2 may also be produced, for example, with a production device (not shown in the drawings) that includes an arrangement unit configured to gather a plurality of colored optical fiber cores 1 and to arrange the same in parallel, and an application roller configured to apply the materials of the intermittent connection 3 to a part of the periphery of the colored optical fiber cores 1. The plurality of colored optical fiber cores 1 is brought into contact with the application roller to intermittently apply the materials of the intermittent connection 3 to side faces of the colored optical fiber cores 1, while the arrangement unit aligns the colored optical fiber cores 1 so that the side faces thereof coated with the materials of the intermittent connection 3 are in contact with each other. Then, the optical fiber ribbon 2 may be yielded by curing the materials with ultraviolet irradiation or the like so that the intermittent connection 3 intermittently connects the colored optical fiber cores 1 to each other.

(VI) Effect of the Invention

In the optical fiber ribbon 2 according to the present invention, the optical fiber ribbon 2 is intermittently connected in the length direction by the intermittent connection 3. The intermittent connection 3 contains a polyol having a weight-average molecular weight of 3000 to 4000 in a specific amount relative to the entire intermittent connection 3 and has Young's modulus at 23° C. within a specific range. Therefore, when unitizing the optical fiber ribbon 2 in which the colored optical fiber cores 1, for example, optical fiber cores with four fibers, eight fibers, twelve fibers, or twenty-four fibers, are gathered to form the optical fiber cable 4, the optical fiber ribbon 2 is capable of maintaining advantages of the optical fiber ribbon 2 such as reliable feasibility of intermediate branching and reliable workability at the time of collective connection. Simultaneously, the optical fiber ribbon 2 prevents cracks of the intermittent connection 3 and detachment of the intermittent connection 3 from the colored optical fiber core 1 when the optical fiber cable 4 is subjected to repetitive ironing and does not impair characteristics of the cable at the time of high-density cabling.

The optical fiber cable 4 provided with the optical fiber ribbon 2 according to the present invention has the effect of the optical fiber ribbon 2 as described above and ensures the intermediate branching of the optical fiber ribbon 2 incorporated therein and workability at the time of collective connection. Simultaneously, the optical fiber cable 4 prevents cracks of the intermittent connection 3 and detachment of the intermittent connection 3 from the colored optical fiber core 1 when being subjected to repetitive ironing and does not impair characteristics of the cable at the time of high-density cabling.

Figure 7:
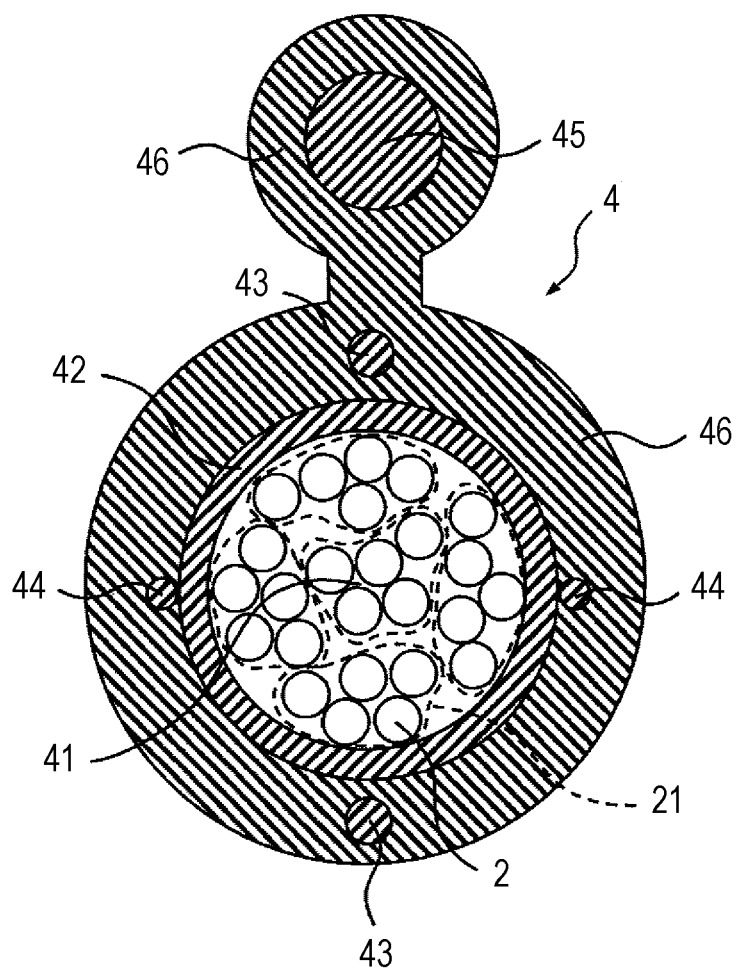
FIG. 7 is a view showing an aspect of an optical fiber cable.

Herein, a configuration of the optical fiber cable 4 is not particularly limited as long as the optical fiber cable 4 is provided with the optical fiber ribbon 2 according to the present invention. FIG. 7 is a view showing an aspect of the optical fiber cable 4. The optical fiber cable 4 shown in FIG. 7 has a snowball configuration in which a predetermined number of the optical fiber ribbons 2 including a predetermined number of fibers is twisted to form the optical fiber unit 21, and a predetermined number of the optical fiber units 21 is twisted to form the cable core 41, and the cable core 41 is surrounded by the buffer layer 42 such as a non-woven tape around which the cladding layer (sheath) 46 made of thermoplastic resin or the like and incorporating two steel wires (tension members) 43, two rip cords 44, and a support wire 45 is formed.

It should be noted that the optical fiber cable 4 according to the present invention may be an optical fiber cable of a center tube type, loose tube type, slotted core type, or the like. The optical fiber cable 4 is not limited to a particular type as long as it includes the cladding layer 46 that covers the periphery of the cable core 41 housing in the optical fiber ribbons 2. The cladding layer 46 may have a thickness, for example, of 2.0 mm to 3.0 mm (preferably 2.44 mm to 2.50 mm), but the thickness is not particularly limited to this range.

(VII) Modification of Embodiment

It should be noted that each of the aspects is an aspect of the present invention, and the present invention is not limited to the embodiment. It goes without saying that modifications and improvements are included in the content of the present invention as long as those modifications and the like have the configuration of the present invention and achieves the object and effect thereof. Furthermore, specific structures, shapes, and the like when carrying out the present invention may be other structures, shapes, and the like as long as the object and effect of the present invention can be achieved. The present invention is not limited to each embodiment described above, and modifications and improvements are included in the present invention within the range where the object of the present invention can be achieved.

For example, in the embodiment, the optical fiber ribbon 2 is described with reference to the configuration of the 8-fiber ribbon as shown in FIGS. 3 to 5. However, the number of fibers in the optical fiber ribbon 2 (the number of colored optical fiber cores 1) may be determined optionally, for example, besides 8-fiber ribbon, 4-fiber ribbon, 12-fiber ribbon, and 24-fiber ribbon are employable. Furthermore, with regard to the cross-sectional shape of the intermittent connection 3, illustrated is an aspect in which the intermittent connection 3 has a substantially triangular shape in the cross-section view that has an arcuate side connecting two sides which are in contact with the colored optical fiber core 1. However, the shape of the intermittent connection 3 is not limited to the aspect and may be any shape as long as the shape is capable of intermittently connecting adjacent colored optical fiber cores 1 in the length direction.

Hereinafter described is another example regarding the cross-sectional shapes of the optical fiber ribbon 2 and the intermittent connection 3 included in the configuration of the present invention. It should be noted that the same reference numerals are given to the same members and to the members having structures similar to those described above, and the detailed description thereof will be omitted or simplified.

Figure 8:
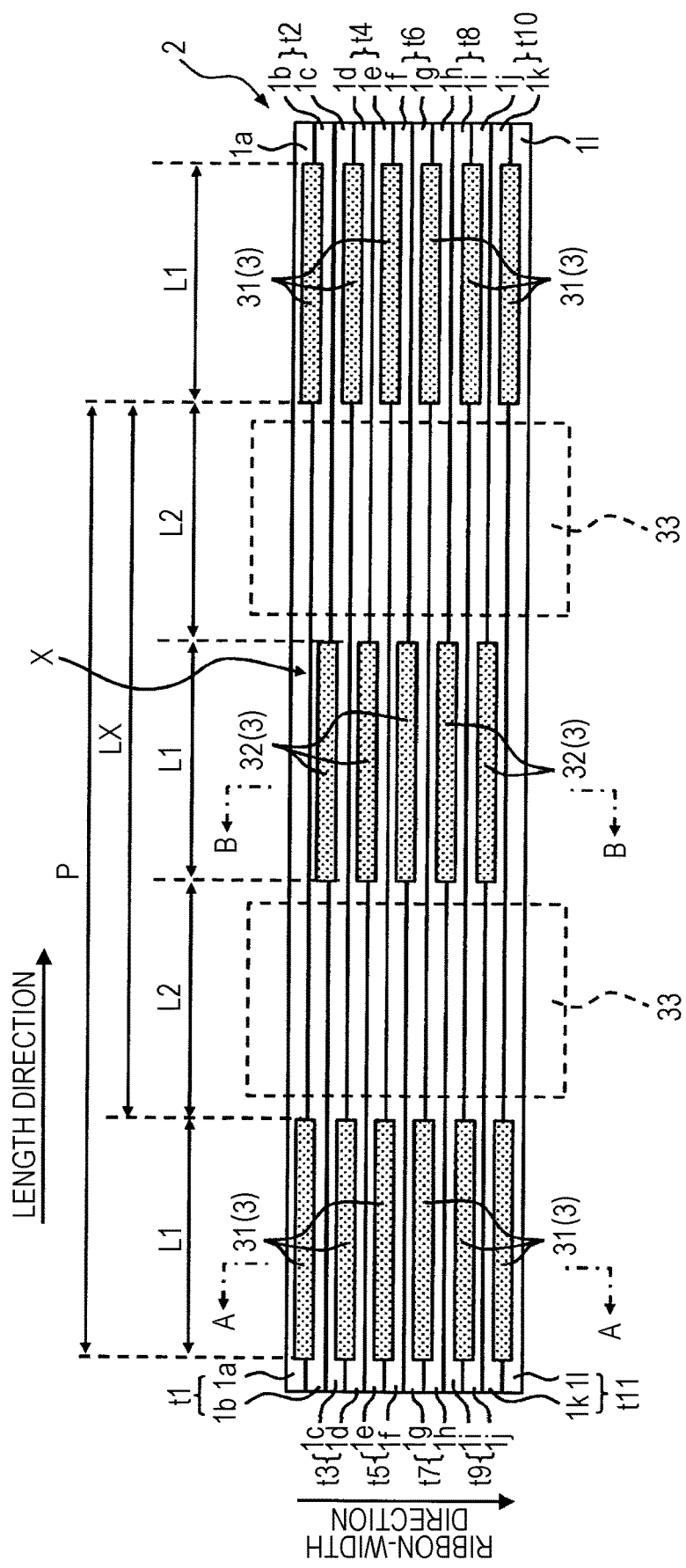
FIG. 8 is a front view showing another aspect of the optical fiber ribbon.
Figure 9:
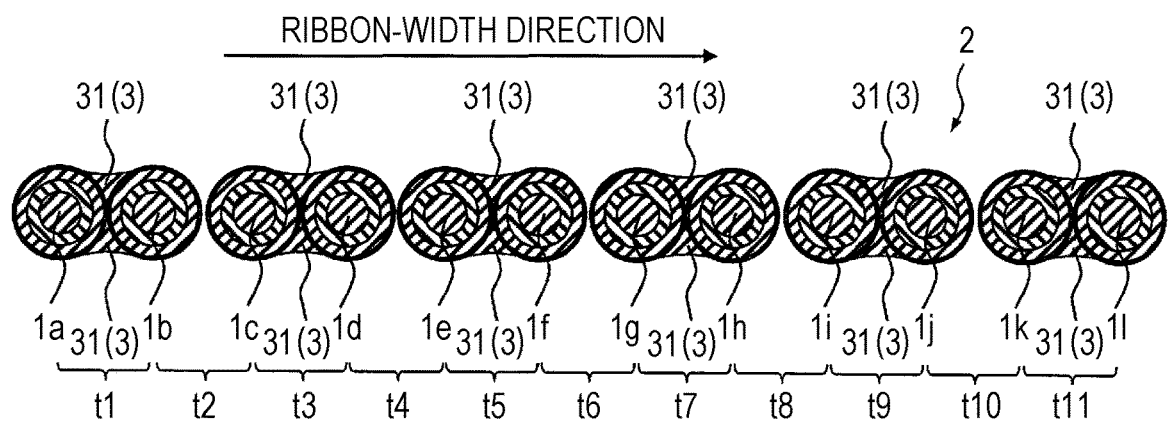
FIG. 9 is a view showing a connected state of the optical fiber ribbon.
Figure 10:
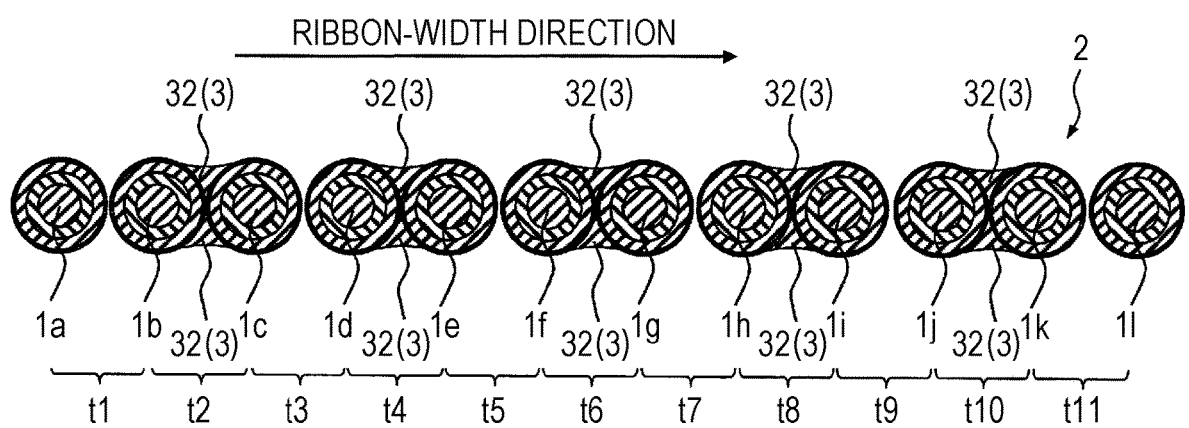
FIG. 10 is a view showing a connected state of the optical fiber ribbon.

FIG. 8 is a front view showing another aspect of the optical fiber ribbon 2. FIGS. 9 and 10 are views showing a connected state of the optical fiber ribbon 2 (FIG. 9 is a cross-sectional view taken along line A-A of FIG. 8 including the intermittent connections 31, and FIG. 10 is a cross-sectional view taken along line B-B of FIG. 8 including the intermittent connections 32).

The optical fiber ribbon 2 shown in FIGS. 8 to 10 is common to the optical fiber ribbon 2 shown in FIGS. 3 to 5 in basic configuration but is different in that the optical fiber ribbon 2 according to the aspect shown in FIG. 3 and the like includes eight colored optical fiber cores 1 (colored optical fiber cores 1*a* to 1*h*), while the optical fiber ribbon 2 according to the aspect shown in FIG. 8 and the like includes twelve colored optical fiber cores 1 (colored optical fiber cores 1*a* to 1*l*).

In other words, the optical fiber ribbon 2 shown in FIG. 8 and the like includes not only the colored optical fiber cores 1*a* to 1*h* but also the colored optical fiber core 1*i* to 1*l* and includes not only the pairs of colored optical fiber cores t1 to t7 but also pairs of colored optical fiber cores t8 to t11. In the optical fiber ribbon 2 herein, six pairs of colored optical fiber cores t1, t3, t5, t7, t9, and t11 are provided with the intermittent connections 31 arranged equally in the ribbon-width direction so as to connect two adjacent colored optical fiber cores 1 (for example, the colored optical fiber cores 1a and 1b), and five pairs of colored optical fiber cores t2, t4, t6, t8, t10 are provided with the intermittent connections 32 arranged equally in the ribbon-width direction so as to connect two adjacent colored optical fiber cores 1 (for example, the colored optical fiber cores 1b and 1c).

Figure 11:
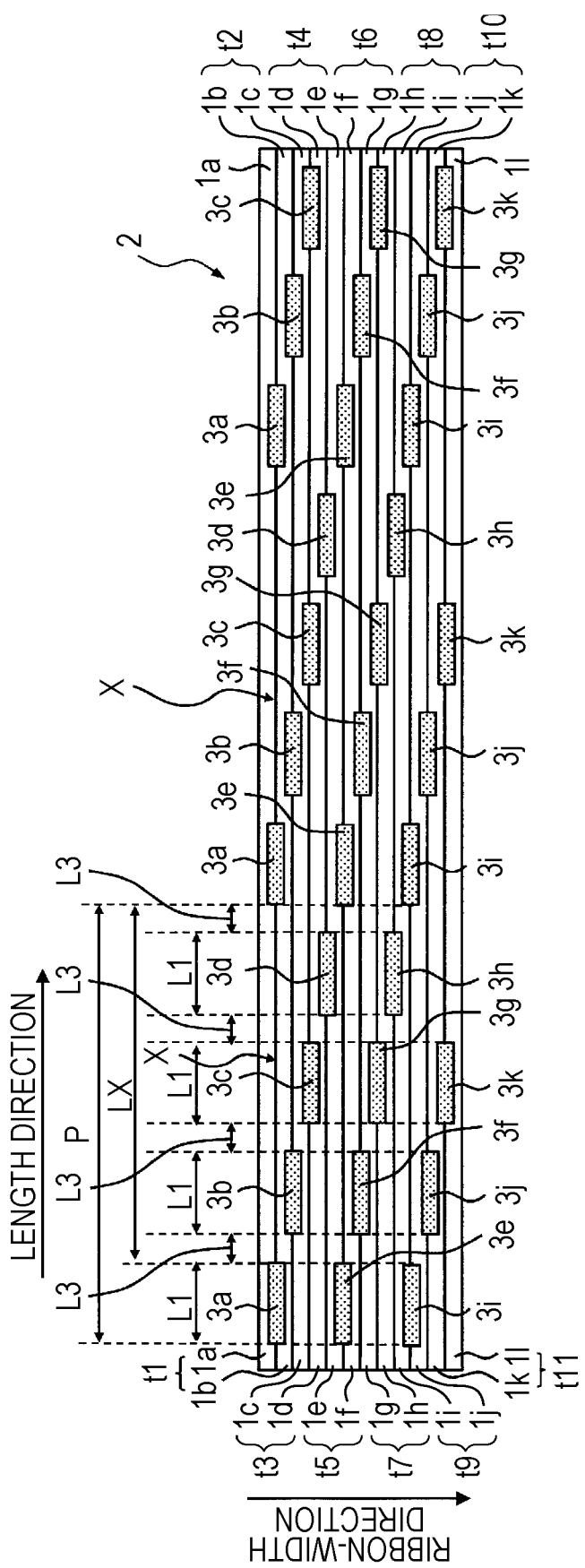
FIG. 11 is a front view showing another aspect of the optical fiber ribbon.

Hereinafter, another example of the optical fiber ribbon 2 included in the configuration of the present invention will be described. FIG. 11 is a front view showing another aspect of the optical fiber ribbon 2.

In the optical fiber ribbon 2 shown in FIG. 11 that includes twelve colored optical fiber cores 1 (colored optical fiber cores 1a to 1l), the colored optical fiber cored 1a and 1b (pair of colored optical fiber cores t1) are connected by the intermittent connection 3a having the length L1, the colored optical fiber cores 1b and 1c (pair of colored optical fiber cores t2) are connected by the intermittent connection 3b having the length L1, the colored optical fiber cores 1c and 1d (pair of colored optical fiber cores t3) are connected by the intermittent connection 3c having the length L1, and the colored optical fiber cores 1d and 1e (pair of colored optical fiber cores t4) are connected by the intermittent connection 3d having the length L1. Furthermore, the intermittent connections 3a and 3b, the intermittent connections 3b and 3c, and the intermittent connections 3c and 3d (and the intermittent connection 3d and the adjacent intermittent connection 3e) are disposed at an interval having a length L3.

Similarly, the colored optical fiber cores 1e and 1f (pair of colored optical fiber cores t5) are connected by the intermittent connection 3e having the length L1, the colored optical fiber cores 1f and 1g (pair of colored optical fiber cores t6) are connected by the intermittent connection 3f having the length L1, the colored optical fiber cores 1g and 1h (pair of colored optical fiber cores t7) are connected by the intermittent connection 3g having the length L1, the colored optical fiber cores 1h and 1i (pair of colored optical fiber cores t8) are connected by the intermittent connection 3h having the length L1. Furthermore, the intermittent connections 3e and 3f, the intermittent connections 3f and 3g, and the intermittent connections 3g and 3h (and the intermittent connection 3h and the adjacent intermittent connection 3i) are disposed at an interval having the length L3.

In addition, the colored optical fiber cores 1i and 1j (pair of colored optical fiber cores t9) are connected by the intermittent connection 3i having the length L1, the colored optical fiber cores 1j and 1k (pair of colored optical fiber cores t10) are connected by the intermittent connection 3j having the length L1, the colored optical fiber cores 1k and 1l (pair of colored optical fiber cores t11) are connected at the intermittent connection 3k of the length L1. Furthermore, the intermittent connections 3i and 3j, and the intermittent connections 3j and 3k are disposed at an interval having the length L3

Due to the connection state and arrangement, the intermittent connections 3a to 3k of the optical fiber ribbon 2 in the front view, as shown in FIG. 11, are arranged regularly and obliquely in the length direction in the following order: the intermittent connection 3a→the intermittent connection 3b→the intermittent connection 3c→ . . . . In addition, the intermittent connections 3a, 3e, and 3i and the intermittent connections 3b, 3f, and 3j are arranged equally in the ribbon-width direction. Similarly, the intermittent connections 3c, 3g, and 3k and the intermittent connections 3d, and 3h are arranged equally in the ribbon-width direction.

The length L1 of the intermittent connections 3a to 3k in the optical fiber ribbon 2 shown in FIG. 11 is preferably about 7 mm to 33 mm, and the length L3 of the intervals shown in FIG. 11 is preferably about 2 mm to 13 mm, but those lengths are not particularly limited to these ranges. In addition, the pitch P in the optical fiber ribbon 2 (the "pitch" represents the length from the intermittent connection 3a (3b to 3k) to the adjacent intermittent connection 3a (3b to 3k) in the length direction, and in FIG. 11, the pitch represents the length from the intermittent connection 3a to the intermittent connection 3a) is preferably 36 mm to 184 mm, but the pitch P is not particularly limited to this range. The length (the length in the length direction between two intermittent connections (for example, two intermittent connections 3a)) LX of the unconnected portion X in a pair of colored optical fiber cores (for example, the pair of colored optical fiber cores t1) is preferably about 29 mm to 151 mm but is not particularly limited to this range. In FIG. 11, for the sake of convenience, the length L1 of the intermittent connections 3a to 3k, the length L3 of the interval, and the pitch P are described in part.

Figure 12:
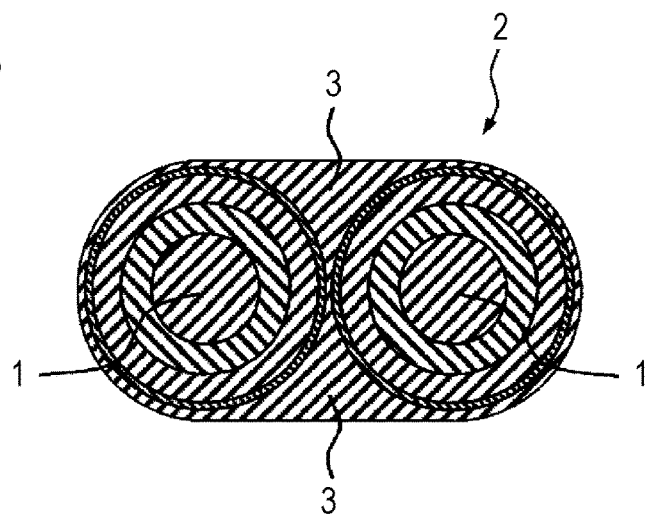
FIG. 12 is a view showing another aspect of a cross-sectional shape of an intermittent connection.

Another example regarding the cross-sectional shape of the intermittent connection 3 of the optical fiber ribbon 2 included in the configuration of the present invention will be described. FIG. 12 is a view showing another aspect of the cross-sectional shape of the intermittent connection 3. As illustrated, as long as the intermittent connection 3 included in the optical fiber ribbon 2 is configured to intermittently connect the adjacent colored optical fiber cores 1 in the length direction, in addition to the cross-sectional structure shown in FIG. 4 and the like, in which the intermittent connection 3 is disposed between two colored optical fiber cores 1 to connect those colored optical fiber cores 1, the cross-sectional structure shown in FIG. 12 may be employable, in which the intermittent connection 3 surrounds two colored optical fiber cores 1 continuously from between the two colored optical fiber cores 1.

For the sake of convenience, in the colored optical fiber core 1 of FIG. 12, the reference numerals of the optical fiber 10, primary cladding layer 11, and the like included in the colored optical fiber core 1 are not shown (the same applies to FIGS. 4, 5, 9, and 10).

The optical fiber ribbon 2 that has the cross-sectional structure as shown in FIG. 12 may be produced by a known method, for example, in which a predetermined number of colored optical fiber cores 1 is parallelly arranged in line, and the colored optical fiber cores 1 are integrated, being covered with the materials included in the intermittent connection 3 so as to make the optical fiber ribbon 2, and the adjacent colored optical fiber cores 1 are formed with unconnected portions 33, X (portions with a single fiber without the intermittent connection 3, not shown in FIG. 12) by intermittently notching between the adjacent colored optical fiber cores 1 in the length direction.

In the embodiment, the optical fiber cable 4 provided with the optical fiber ribbon 2 is illustrated as having the configuration shown in FIG. 7, but the configuration of the optical fiber cable 4 is not limited to the above configuration. In addition, it is possible to freely select, for example, types and thickness of the cladding layer 46, the number and size of the colored optical fiber cores 1 and optical fiber ribbons 2, the number and size of the optical fiber units 21, the number of the optical fiber ribbons 2 in the optical fiber unit 21, types, the number, and size of the steel wire (tension member) 43, and types, thickness, and the number of layers in the buffer layer 42. Furthermore, it is possible to freely select the size of the outer diameter, and the cross-sectional shape of the optical fiber cable 4.

Figure 13:
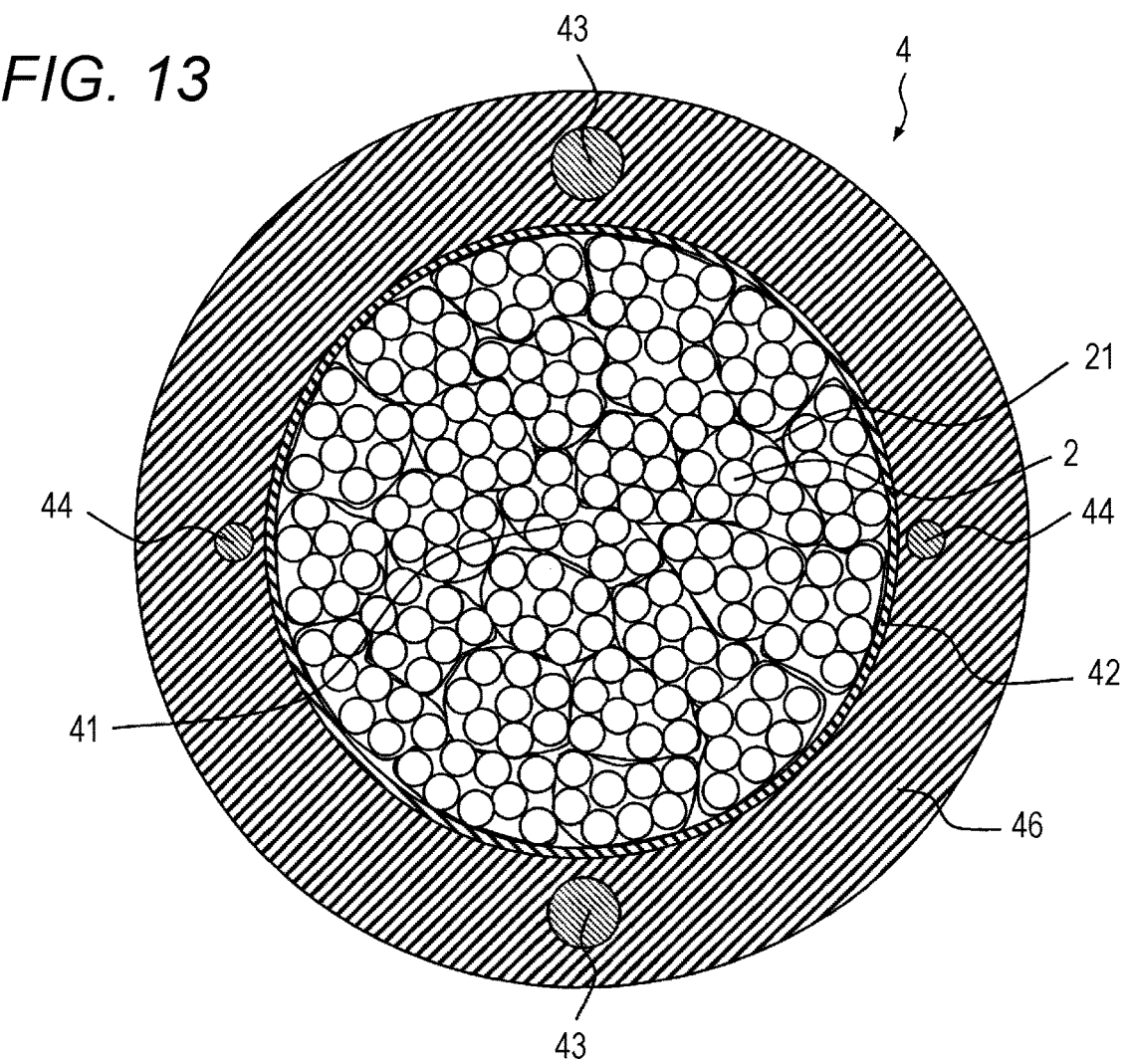
FIG. 13 is a view showing another aspect of the optical fiber cable.

Another aspect of the optical fiber cable 4 will be described with reference to FIGS. 13 to 15. FIG. 13 is a view showing another aspect of the optical fiber cable 4. The optical fiber cable 4 herein has a configuration in which a predetermined number (eight in FIG. 13) of the optical fiber ribbons 2 including a predetermined number of fibers is twisted to form the optical fiber unit 21, and a predetermined number (twenty-five in FIG. 13) of the optical fiber units 21 is twisted to form the cable core 41. The cable core 41 is surrounded by the buffer layer 42 such as a non-woven tape. Around the buffer layer 42, formed is the cladding layer (sheath) 46 which includes thermoplastic resin or the like and incorporates two steel wires (tension members) 43, and two rip cords 44.

Figure 14:
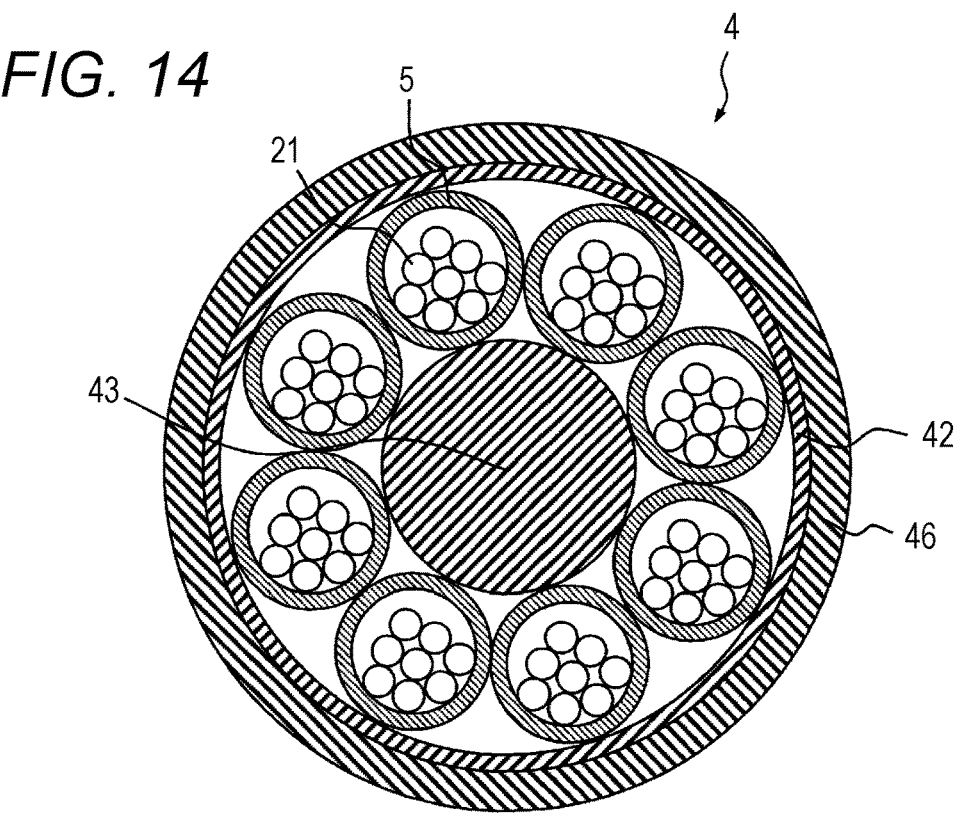
FIG. 14 is a view showing another aspect of the optical fiber cable.
Figure 15:
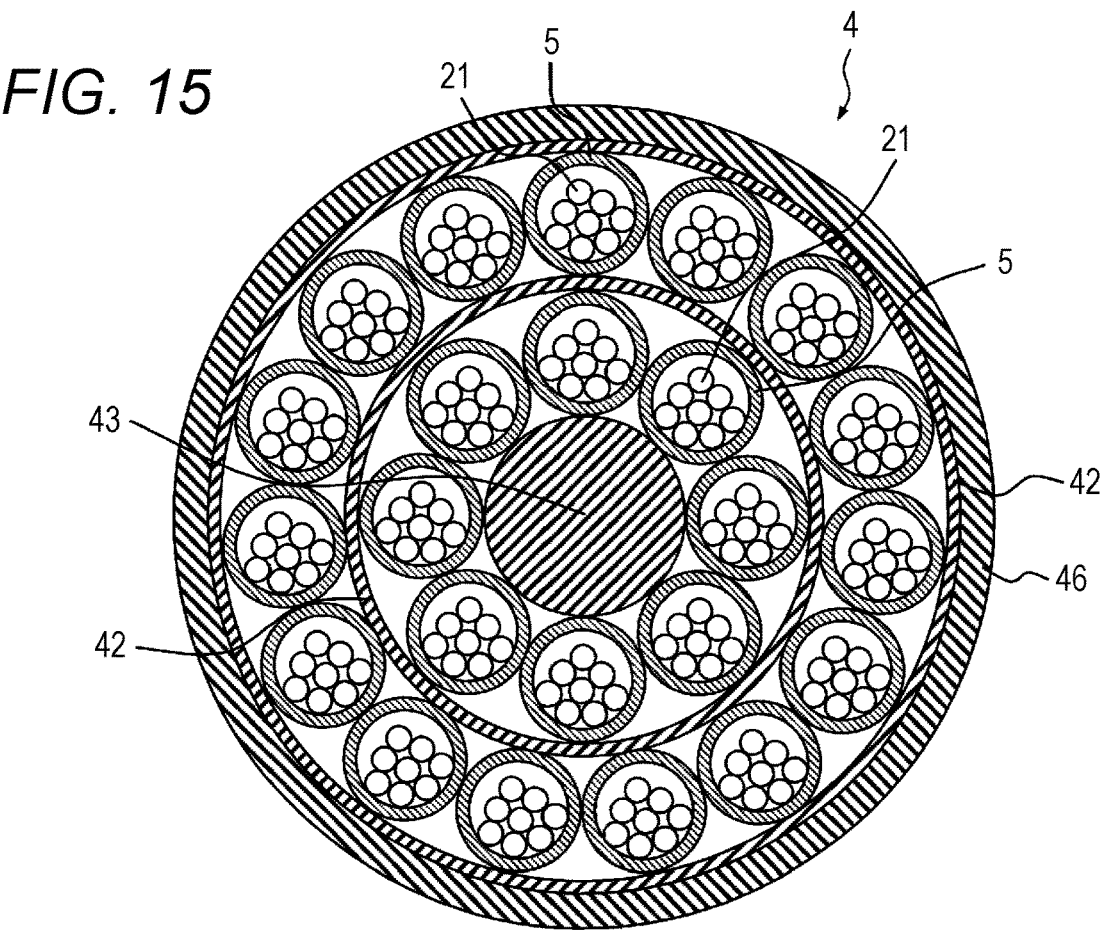
FIG. 15 is a view showing another aspect of the optical fiber cable.

FIG. 14 and FIG. 15 are views each showing another aspect of the optical fiber cable 4. In the optical fiber cable 4 shown in FIG. 14, a predetermined number of the optical fiber ribbons 2 (not shown in FIG. 14 and FIG. 15 to be described later) including a predetermined number of fibers is twisted to form the optical fiber unit 21, and a predetermined number (eight in FIG. 14 and FIG. 15 to be described later) of the optical fiber units 21 is twisted. In such a state, the optical fiber units 21 are incorporated in a loose tube 5, and a predetermined number (eight in FIG. 14) of loose tubes 5 is arranged around the steel wire (tension member) 43. Furthermore, for example, the buffer layer 42 such as a non-woven tape and the cladding layer (sheath) 46 including thermoplastic resin or the like are formed around the periphery of the loose tubes 5 so as to form the optical fiber cable 4.

In the optical fiber cable 4 of FIG. 15, first, the optical fiber units 21 similar to those according to the aspect shown in FIG. 14 and a predetermined number (eight in FIG. 15) of loose tubes 5 incorporating the optical fiber units 21 are twisted around the steel wire (tension member) 43, and the buffer layer 42 such as a non-woven tape is wound around the periphery thereof. Furthermore, the optical fiber units 21 and a predetermined number (fifteen in FIG. 15) of loose tubes 5 incorporating the optical fiber units 21 are twisted around the buffer layer 42. Still further, for example, the buffer layer 42 such as a non-woven tape and the cladding layer (sheath) 46 including thermoplastic resin or the like are formed around the periphery of the loose tubes 5 so as to form the optical fiber cable 4.

In FIG. 7 and FIGS. 13 to 15, for the sake of convenience, the hatching of the optical fiber ribbon 2 (FIGS. 7 and 13) and the optical fiber unit 21 (FIGS. 14 and 15) are omitted, and the reference numerals of the optical fiber ribbon 2 and optical fiber unit 21 (FIGS. 7 and 13) and the reference numerals of the optical fiber unit 21 and loose tube 5 (FIGS. 14 and 15) are shown in part.

Specific structures, shapes, and the like when carrying out the present invention may be any other structures and the like as long as the object of the present invention can be achieved.

EXAMPLES

Hereinafter, the present invention will be described in more detail based on Examples and Comparative Examples, but the present invention is not limited thereto.

Examples 1 to 10, Comparative Examples 1 to 6

Production of Optical Fiber Ribbon:

Utilizing the contents shown in Table 1 and the components shown below, optical fiber ribbons having the configuration shown in FIGS. 3 to 5 and including the colored optical fiber cores shown in FIGS. 1 and 2 were produced by a method shown in the following (1) and (2). It should be noted that the term "molecular weight" hereinafter represents "weight-average molecular weight". With regard to a primary cladding layer, secondary cladding layer, color layer, and intermittent connection, the following components were used.

(1) Production of Colored Optical Fiber Core (1)
(Example 1, Example 3, Examples 6 to 9,
Comparative Example 1, Comparative Example 2,
and Comparative Examples 4 to 6)

A primary cladding layer (primary layer) having an outer diameter of 195 μm and a secondary cladding layer (secondary layer) having an outer diameter of 242 μm were coated around a glass optical fiber made of silica glass having an outer diameter of 125 μm so as to obtain an optical fiber element. With regard to the optical fiber element obtained, a color layer was coated around the secondary cladding layer in a separate step so as to yield a colored optical fiber core having an outer diameter of 255 μm and having the configuration shown in FIG. 1.

(1-1) Production of Colored Optical Fiber Core (1')
(Example 10)

A primary cladding layer (primary layer) having an outer diameter of 158 μm and a secondary cladding layer (secondary layer) having an outer diameter of 190 μm were coated around a glass optical fiber made of silica glass having an outer diameter of 125 μm so as to obtain an optical fiber element. With regard to the optical fiber element obtained, a color layer was coated around the secondary cladding layer in a separate step so as to yield a colored optical fiber core having an outer diameter of 200 μm and having the configuration shown in FIG. 1.

(2) Production of Colored Optical Fiber Core (2)
(Example 2, Example 4, Example 5, and
Comparative Example 3)

A primary cladding layer (primary layer) having an outer diameter of 185 μm and a secondary cladding layer (secondary layer) having an outer diameter of 255 μm were coated around a glass optical fiber made of silica glass having an outer diameter of 125 μm so as to yield a colored optical fiber core having an outer diameter of 255 μm and having the configuration shown in FIG. 2.

(Components of Primary Cladding Layer and Secondary Cladding Layer)

In the primary cladding layer and secondary cladding layer (with regard to Examples 2, 4, 5, and Comparative Example 3, the following component b was used as the colored secondary cladding layer), an oligomer including polypropylene glycol as an ultraviolet curable resin (an oligomer that includes polypropylene glycol as a middle block and that has, as a skeletal component, hydroxy groups at both terminals to which hydroxyethyl acrylate is bonded through tolylene diisocyanate), diluent monomer, photo initiator, and additive were mixed in an appropriate amount.

(Components of Color Layer)

With respect to the color layer (and the colored secondary cladding layer), the following components a, b, c, and d were used and conditions for ultraviolet curing such as a molecular weight, and contained amount of each component, types, the number, and contained amount of functional groups in the diluent monomer, types of photo initiator, or amount of radiation were changed so as to make the hysteresis value satisfy the value shown in Table 1. In particular, dynamic contact angles (advancing contact angle α, receding contact angle β, and hysteresis value (α–β)) was controlled by adjusting an oxygen concentration and amount of ultraviolet radiation. It should be noted that a colorant containing an appropriate amount of pigment was added to the color layer (and the colored secondary cladding layer).

(a) Component a (Example 1, Example 3, Examples 6 to 8, Example 10, Comparative Example 1, and Comparative Example 6)

In an ultraviolet curable resin included in the component a to be the color layer, urethane acrylate or bisphenol A epoxy acrylate was used as the oligomer, and a bifunctional monomer or polyfunctional monomer was added thereto as the monomer so as to adjust Young's modulus. Furthermore, a both terminal-acrylic modified silicone was contained to be 3 mass % relative to the entire color layer. As the photo initiator, 2-methyl-1-(4-methylthiophenyl)-2-morpholino-propane-1-one (Irgacure 907), 2,4,6-trimethylbenzoyl-diphenyl-phosphine oxide (Lucirin TPO), and 2,4-diethylthioxanthone (Kayacure DETX-S) were added. In the production, the oxygen concentration was adjusted to be 3 to 5%, and the amount of ultraviolet radiation was adjusted to be 80 mJ/cm$^2$ or less.

(b) Component b (Example 2, Example 4, Example 5, and Comparative Example 3)

In an ultraviolet curable resin included in the component b to be the colored secondary cladding layer (color layer), as the oligomer, an oligomer in which an aromatic isocyanate and hydroxyethyl acrylate were added to a polyol including polypropylene glycol was used. Young's modulus was adjusted by changing a molecular weight of the polyol (polypropylene glycol) serving as a middle block or by adding a bifunctional monomer or polyfunctional monomer. In order to improve toughness, bisphenol A epoxy acrylate was added, and a side chain-acrylic modified silicone was contained to be 2 mass % relative to the entire color layer. As the photo initiator, 1-hydroxy-cyclohexyl-phenyl-ketone (Irgacure 184), and 2,4,6-trimethylbenzoyl-diphenyl-phosphine oxide (Lucirin TPO) were added. In the production, the oxygen concentration was adjusted to be 0.01 to 22%, and the amount of ultraviolet radiation was adjusted to be 80 mJ/cm$^2$ or less.

(c) Component c (Example 9, and Comparative Example 2)

In an ultraviolet curable resin included in the component c to be the color layer, hydroxypivalic acid neopentyl glycol acrylic acid adduct or bisphenol A epoxy acrylate was used as the oligomer, and a bifunctional monomer or polyfunctional monomer was added thereto as the monomer so as to adjust Young's modulus. Furthermore, a one terminal-acrylic modified silicone was contained to be 3 mass % relative to the entire color layer. As the photo initiator, 2-methyl-1-(4-methylthiophenyl)-2-morpholinopropane-1-one (Irgacure 907), 2,4,6-trimethylbenzoyl-diphenyl-phosphine oxide (Lucirin TPO), 2,4-diethylthioxanthone (Kayacure DETX-S) were added. In the production, the oxygen concentration was adjusted to be 2 to 4%, and the amount of ultraviolet radiation was adjusted to be 90 mJ/cm$^2$ or less.

(d) Component d (Comparative Example 4, and Comparative Example 5)

In an ultraviolet curable resin included in the component d to be the color layer, hydroxypivalic acid neopentyl glycol acrylic acid adduct or bisphenol A epoxy acrylate was used as the oligomer, and a bifunctional monomer or polyfunctional monomer was added thereto as the monomer so as to adjust Young's modulus. Furthermore, a both terminal-acrylic modified silicone was contained to be 4 mass % relative to the entire color layer. As the photo initiator, 2-methyl-1-(4-methylthiophenyl)-2-morpholinopropane-1-one (Irgacure 907), 2-benzyl-2-dimethylamino-1-(4-morpholinophenyl) butanone-1 (Irgacure 369), and 2,4-diethylthioxanthone (Kayacure DETX-S) were added. In the production, the oxygen concentration was adjusted to be 0.1 to 2%, and the amount of ultraviolet radiation was adjusted to be 90 mJ/cm$^2$ or less.

(3) Production of Optical Fiber Ribbon

Eight colored optical fiber cores obtained as described above were arranged in parallel, and the following materials were applied in a predetermined pattern (the length of the intermittent connections 31, 32 in FIG. 3: 30 mm, the length of each unconnected portion 33: 10 mm, the length of each pitch P: 80 mm) and were cured to form intermittent connections (and unconnected portions) as shown in FIGS. 3 to 5, thereby yielding an optical fiber ribbon.

With regard to the materials of the intermittent connection, in addition to the polyol (polypropylene glycol was used) having the weight-average molecular weight and contained amount (relative to the entire intermittent connection, the same applied to the after-mentioned colorant) shown in Table 1, the following components were used. It should be noted that a colorant containing an appropriate amount of pigment was added in a contained amount shown in Table 1.

(Components of Intermittent Connection)

With regard to the materials of the intermittent connection, as the ultraviolet curing resin, an oligomer was used (an oligomer that includes polypropylene glycol having a weight-average molecular weight of 2,000 as a middle block and that has, as a skeletal component, hydroxy groups at both terminals to which hydroxyethyl acrylate is bonded through tolylene diisocyanate); as the monofunctional monomer, isobornyl acrylate, 2-ethylhexyl acrylate, lauryl acrylate, N-vinylcaprolactam, PO-modified nonyl phenol acrylate, isononyl acrylate, isodecyl acrylate, polyethylene glycol acrylate, and N-vinylpyrrolidone were used; as the bifunctional monomer, tricyclodecanedimethylol diacrylate, EO-modified bisphenol A diacrylate, and 1,6-hexanediol diacrylate were used; and as the polyfunctional monomer, tricyclodecanedimethylol triacrylate was used. As the photo initiator, 1-hydroxy-cyclohexyl-phenyl-ketone, 2-hydroxy-2-methyl-1-phenyl-propane-1-one, and 2,4,6-trimethylbenzoyl-diphenyl-phosphine oxide were used. Furthermore, appropriate amounts of a hindered amine light stabilizer as the light stabilizer and silicone (weight-average molecular weight: about 10,000) as the additive were mixed. Conditions for ultraviolet curing such as the molecular weight and contained amount of the oligomer, types, the number, and contained amount of functional groups in the diluent monomer, and amount of radiation were changed so as to make the Young's modulus satisfy the value shown in Table 1 when the materials were mixed with a separately additive polyol (polypropylene glycol) having the weight average molecular weight and the contained amount described in Table 1, thereby yielding the materials of the intermittent connection.

Test Example 1

With respect to the optical fiber ribbons obtained in Examples 1 to 10 and Comparative Examples 1 to 6, "(1) Young's modulus of intermittent connection", "(2) hysteresis value of colored optical fiber core (difference of dynamic contact angles)", "(3) transmission loss after heat cycle", and "(4) ironing test" were compared and determined by the following measurement method and test method. The results are shown in Table 1. It should be noted that (2) was determined with respect to the colored optical fiber core, and (3) and (4) were determined after forming the optical fiber ribbon into a cable by the following production method.

(1) Young's Modulus of Intermittent Connection:

The intermittent connection was removed from the optical fiber ribbon to obtain a sample. An end portion of the sample was bonded and fixed to an aluminum plate with a gelled instant adhesive (trade name: Aron Alpha (registered trademark), manufactured by Toagosei Co., Ltd.). A portion of the aluminum plate to which the sample was not bonded was fixed to a chuck, and the force at elongation of 2.5% was measured with TENSILON, the universal tensile testing machine, in an atmosphere of 23° C.×55% RH at a gauge line interval of 10 mm and at a tension rate of 1 mm/min. Based on the measurement value, the Young's modulus (tensile Young's modulus) was calculated.

(2) Hysteresis Value of Colored Optical Fiber Core (Difference of Dynamic Contact Angles):

A surface condition of the colored optical fiber core was determined by the dynamic contact angles according to the Wilhelmy plate method. The dynamic contact angles were measured with an automatic tensiometer (K100, manufactured by KRUSS GmbH). With regard to the measurement environment, the temperature was 23° C., and the humidity was 55%. A contact angle when the colored optical fiber core is fixed to the probe of the automatic tensiometer with the double-faced tape and when the colored optical fiber core is immersed in pure water having known surface tension at a constant rate is defined as the advancing contact angle α. Conversely, a contact angle when the colored optical fiber core is retracted from the pure water at a constant rate is defined as the receding contact angle β. A value obtained by measuring the advancing contact angle α and the receding contact angle β and by subtracting the receding contact angle β from the advancing contact angle α is referred to the hysteresis value (α–β). The hysteresis value was calculated by the Wilhelmy plate method, considering that the surface tension of pure water was 72.8.

(Production of Optical Fiber Cable)

Five optical fiber ribbons with eight fibers were twisted together to form an optical fiber unit, then, five optical fiber units were twisted together to form a cable core around which a non-woven tape was wound (when using an optical fiber ribbon with four fibers, ten optical fiber units including five twisted optical fiber ribbons were twisted). Furthermore, the periphery of a buffer layer was formed with the cladding layer together with two steel wires having a diameter of φ 0.7 mm and two rip cords (a configuration substantially similar to one shown in FIG. 7). With regard to formation of a cable, thermoplastic resin was coated as the cladding layer (sheath) to form a cable. A flame-retardant polyolefin was used as the thermoplastic resin, and the thermoplastic resin was coated at a temperature of 200 to 240° C. and at an extrusion pressure of 20 to 35 MPa so as to form the cladding layer having a thickness of 2.4 mm to 2.7 mm around the cable core.

(3) Transmission Loss after Heat Cycle:

Transmission loss was measured when carrying out the heat cycle of –30° C. to +70° C. for 3 cycles (1 cycle: 6 hours) with respect to the optical fiber cable including the cabled optical fiber ribbons. The transmission loss was measured by measuring transmission loss at a wavelength of 1.55 μm, and the transmission loss (loss level) of 0.1 dB/km or less at a wavelength of 1550 nm was determined to be a criterion (0.1 dB/km or less indicates success, and over 0.1 dB/km indicates failure).

(4) Ironing Test:

An ironing test was conducted under the conditions conforming to JIS C6851.

(Ironing Test: Transmission Loss)

The transmission loss after the ironing test was measured. The transmission loss was measured with respect to the optical fiber cable after the ironing test by measuring transmission loss at a wavelength of 1.55 μm in the length direction, and the transmission loss (loss level) of 0.1 dB/km or less at a wavelength of 1550 nm was determined to be a criterion (0.1 dB or less indicates success, and over 0.1 dB indicates failure).

(Ironing Test: Cracks and Detachment of Intermittent Connection)

With respect to the optical fiber ribbon after the ironing test, the presence or absence of cracks of the intermittent connection and detachment of the intermittent connection from the colored optical fiber core were determined. An optical fiber ribbon with no cracks of the intermittent connection and no detachment of the intermittent connection from the colored optical fiber core after the ironing test was determined as "o"; an optical fiber ribbon with cracks of the intermittent connection was determined as "cracked"; and an optical ribbon with detachment of the intermittent connection from the colored optical fiber core was determined as "detached".

TABLE 1

(Compositions and Results)

| | | | Examples | | | | | | | | | |
|---|---|---|---|---|---|---|---|---|---|---|---|---|
| | | | 1 | 2 | 3 | 4 | 5 | 6 | 7 | 8 | 9 | 10 |
| Layer structure of colored optical fiber core | | | Three-layer | Two-layer | Three-layer | Two-layer | Two-layer | Three-layer | Three-layer | Three-layer | Three-layer | Three-layer |
| Outer diameter of colored optical fiber core | | μm | 255 | 255 | 255 | 255 | 255 | 255 | 255 | 255 | 255 | 200 |
| Base material of color layer and the like | | | a | b | a | b | b | a | a | a | c | a |
| Polyol contained in intermittent connection | Weight-average molecular weight | Mw | 3000 | 3000 | 3000 | 4000 | 4000 | 3000 | 3000 | 3000 | 3000 | 3000 |
| | Contained amount | mass % | 25 | 30 | 23 | 25 | 30 | 20 | 23 | 25 | 20 | 23 |

TABLE 1-continued (Compositions and Results)

| | | | | | | | | | | | |
|---|---|---|---|---|---|---|---|---|---|---|---|
| Colorant | mass % | 2.5 | 2.5 | 1.5 | 2.5 | 2.5 | 2.5 | 2.5 | 0.5 | 2.5 | 1.5 |
| (1) Young's modulus of intermittent connection | MPa | 115 | 78 | 133 | 110 | 70 | 138 | 130 | 120 | 140 | 133 |
| (2) α (advancing contact angle) | degree | 90 | 83 | 90 | 83 | 83 | 90 | 90 | 90 | 82 | 90 |
| (2) β (receding contact angle) | degree | 53 | 51 | 53 | 51 | 51 | 53 | 53 | 53 | 58 | 53 |
| (2) Hysteresis value | degree | 37 | 32 | 37 | 32 | 32 | 37 | 37 | 37 | 24 | 37 |
| (3) Transmission loss after heat cycle | dB/km | 0.01 | 0.01 | 0.01 | 0.01 | 0.01 | 0.01 | 0.01 | 0.01 | 0.02 | 0.01 |
| (4) Ironing test: Transmission loss | dB | 0.02 | 0.02 | 0.02 | 0.01 | 0.01 | 0.02 | 0.02 | 0.01 | 0.04 | 0.02 |
| (4) Ironing test: Cracks and detachment of intermittent connection | | ○ | ○ | ○ | ○ | ○ | ○ | ○ | ○ | ○ | ○ |

| | | | Comparative Examples | | | | | |
|---|---|---|---|---|---|---|---|---|
| | | | 1 | 2 | 3 | 4 | 5 | 6 |
| Layer structure of colored optical fiber core | | | Three-layer | Three-layer | Two-layer | Three-layer | Three-layer | Three-layer |
| Outer diameter of colored optical fiber core | | μm | 255 | 255 | 255 | 255 | 255 | 255 |
| Base material of color layer and the like | | | a | c | b | d | d | a |
| Polyol contained in intermittent connection | Weight-average molecular weight | Mw | — | 3000 | 3000 | 4000 | 2000 | 4500 |
| | Contained amount | mass % | 0 | 15 | 35 | 35 | 20 | 30 |
| Colorant | | mass % | 2.5 | 2.5 | 2.5 | 2.5 | 2.5 | 2.5 |
| (1) Young's modulus of intermittent connection | | MPa | 250 | 170 | 40 | 35 | 175 | 38 |
| (2) α (advancing contact angle) | | degree | 90 | 82 | 83 | 102 | 102 | 90 |
| (2) β (receding contact angle) | | degree | 53 | 58 | 51 | 81 | 81 | 53 |
| (2) Hysteresis value | | degree | 37 | 24 | 32 | 21 | 21 | 37 |
| (3) Transmission loss after heat cycle | | dB/km | 0.02 | 0.01 | 0.03 | 0.03 | 0.03 | 0.03 |
| (4) Ironing test: Transmission loss | | dB | 0.03 | 0.03 | 0.03 | 0.05 | 0.03 | 0.03 |
| (4) Ironing test: Cracks and detachment of intermittent connection | | | Cracked | Cracked | Detached | Detached | Cracked | Detached |

As shown in Table 1, in Examples 1 to 10, (1) Young's modulus of intermittent connection is over 40 MPa and under 170 MPa (hereinafter referred to as "specified range"), and (3) transmission loss after heat cycle and (4) ironing test were satisfactory. Furthermore, (2) hysteresis value of colored optical fiber core was over 24 degrees. On the other hand, in Comparative Examples 1 to 6, (1) Young's modulus of intermittent connection was out of the specified range, and "cracks and detachment of intermittent connection" in (4) ironing test was of a problem. In Example 9, "cracks and detachment of intermittent connection" in (4) ironing test was successful. Although, there was slight slippage on the surface of the colored optical fiber core, the degree of slippage was acceptable in the actual use.

INDUSTRIAL APPLICABILITY

The present invention is effectively usable as a tool for providing an optical fiber ribbon and optical fiber cable which do not impair characteristics of a cable at the time of high-density cabling and which have high industrial applicability.

REFERENCE SIGNS LIST

1 Colored optical fiber core
1*a* to 1*h*, 1*i* to 1*l* Colored optical fiber core
10 Optical fiber (glass optical fiber)
11 Primary cladding layer (primary layer)
12 Secondary cladding layer (secondary layer)
12*a* Colored secondary cladding layer
13 Color layer
2 Optical fiber ribbon
21 Optical fiber unit
3 Intermittent connection
31, 32 Intermittent connection
3*a* to 3*k* Intermittent connection
33, X Unconnected portion (single-fiber portion)
4 Optical fiber cable
41 Cable core
42, 42*a* Buffer layer
43 Steel wire (tension member)
44 Rip cord
45 Support wire
46 Cladding layer (sheath)
5 Loose tube
t1 to t8, t9, t10 Pair of colored optical fiber cores

The invention claimed is:

1. An optical fiber ribbon comprising colored optical fiber cores arranged in parallel, wherein each of the colored optical fiber cores is formed with at least two cladding layers whose outermost layer is colored and which are formed around an optical fiber to cover the optical fiber, and the adjacent colored optical fiber cores are intermittently connected to each other both in a length direction and in a width direction, wherein intermittent connections and unconnected portions are alternately arranged at a predetermined length in the length direction, and intermittent connections and unconnected portions are alternately arranged at a predetermined length in the width direction, wherein the intermittent connection contains a polyol having a weight-average molecular weight of 3000 to 4000 in an amount of 20 to 30 mass % relative to the entire intermittent connection, and the intermittent connection has Young's modulus at 23° C. over 40 MPa and under 170 MPa.

2. The optical fiber ribbon according to claim 1, each of the colored optical fiber cores has a hysteresis value (α−β)

exceeding 24 degrees, wherein the hysteresis value is a difference between an advancing contact angle α and a receding contact angle β with respect to pure water calculated by the Wilhelmy plate method.

3. The optical fiber ribbon according to claim 1, wherein the polyol contained in the intermittent connection is polypropylene glycol.

4. The optical fiber ribbon according to claim 2, wherein the polyol contained in the intermittent connection is polypropylene glycol.

5. An optical fiber cable comprising the optical fiber ribbon according to claim 1.

6. An optical fiber cable comprising the optical fiber ribbon according to claim 2.

7. An optical fiber cable comprising the optical fiber ribbon according to claim 3.

8. An optical fiber cable comprising the optical fiber ribbon according to claim 4.

* * * * *